United States Patent
Donovan et al.

(10) Patent No.: US 8,130,098 B2
(45) Date of Patent: *Mar. 6, 2012

(54) SYSTEMS AND METHODS FOR SAFETY AND BUSINESS PRODUCTIVITY

(75) Inventors: John J Donovan, Hamilton, MA (US); Daniar Hussain, Johnstown, PA (US)

(73) Assignee: KD Secure LLC, Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,550

(22) Filed: Sep. 6, 2011

(65) Prior Publication Data

US 2011/0320389 A1 Dec. 29, 2011

Related U.S. Application Data

(63) Continuation of application No. 12/279,720, filed as application No. PCT/US2007/80488 on Oct. 4, 2007, now Pat. No. 8,013,738.

(51) Int. Cl.
G08B 21/00 (2006.01)
(52) U.S. Cl. .............. 340/540; 340/506; 340/539.25; 340/521; 340/541; 340/937
(58) Field of Classification Search ........... 340/506, 340/531, 539.25, 517, 521, 532, 541, 3.1, 340/519, 540, 545.2, 933, 936, 937, 942, 340/934, 286.07, 573.4; 348/14.01, 143, 348/148, 149; 382/103, 104; 702/159; 701/119; 706/12, 45, 47

See application file for complete search history.

(56) References Cited

U.S. PATENT DOCUMENTS

| | | |
|---|---|---|
| 5,164,979 A | 11/1992 | Choi |
| 5,365,217 A | 11/1994 | Toner |
| 5,382,943 A | 1/1995 | Tanaka |
| 5,638,302 A | 6/1997 | Gerber |
| 5,666,157 A | 9/1997 | Aviv |
| 5,786,746 A | 7/1998 | Lombardo et al. |
| 5,969,755 A * | 10/1999 | Courtney ............... 348/143 |
| 5,982,418 A * | 11/1999 | Ely ........................ 348/153 |
| 6,055,543 A | 4/2000 | Christensen |
| 6,249,225 B1 | 6/2001 | Wang |
| 6,437,819 B1 | 8/2002 | Loveland |
| 6,525,663 B2 | 2/2003 | Colmenarez et al. |
| 6,546,388 B1 | 4/2003 | Edlund et al. |
| 6,570,496 B2 | 5/2003 | Britton |

(Continued)

OTHER PUBLICATIONS

A.W. Senior, et al., "Video analytics for retail," IBM T. J. Watson Research Center, *Proceedings of the IEEE International Conference on Advanced Video and Signal Based Surveillance*, AVSS 2007, Sep. 2007.

(Continued)

*Primary Examiner* — Anh V La
(74) *Attorney, Agent, or Firm* — American Patent Agency PC; Daniar Hussain; Brian Smith

(57) ABSTRACT

The present invention is a safety and business productivity system having the following components. One or more cameras capture video data having attribute data, the attribute data representing importance of the cameras. One or more video analytics devices process the video data from one or more of the cameras and detect primitive video events in the video data. A correlation engine correlates two or more primitive video events from the video analytics devices weighted by the attribute data of the cameras used to capture the video data. An alerting engine generates one or more alerts and performs one or more actions based on the correlation performed by the correlation engine.

20 Claims, 14 Drawing Sheets

U.S. PATENT DOCUMENTS

| | | | |
|---|---|---|---|
| 6,628,805 B1 | 9/2003 | Hansen et al. | |
| 6,700,487 B2 | 3/2004 | Lyons et al. | |
| 6,778,085 B2 | 8/2004 | Faulkner et al. | |
| 6,788,205 B1 | 9/2004 | Mason et al. | |
| 6,859,803 B2 | 2/2005 | Dagtas et al. | |
| 6,940,397 B1 | 9/2005 | Le Mire | |
| 6,940,998 B2 | 9/2005 | Garoutte | |
| 6,941,290 B2 | 9/2005 | Siskind | |
| 6,958,676 B1 | 10/2005 | Morgan et al. | |
| 6,965,313 B1 | 11/2005 | Saylor et al. | |
| 6,968,294 B2 | 11/2005 | Gutta et al. | |
| 6,970,102 B2 | 11/2005 | Ciolli | |
| 6,972,787 B1 | 12/2005 | Allen et al. | |
| 6,975,220 B1 | 12/2005 | Foodman et al. | |
| 6,975,346 B2 | 12/2005 | Kumhyr | |
| 7,016,518 B2 | 3/2006 | Vernon | |
| 7,046,169 B2 | 5/2006 | Bucholz et al. | |
| 7,051,048 B2 | 5/2006 | Sohma | |
| 7,382,244 B1 | 6/2008 | Donovan et al. | |
| 8,013,738 B2 * | 9/2011 | Donovan et al. | 340/540 |

OTHER PUBLICATIONS

Arun Hampapur, et al., "S3-R1: The IBM Smart Surveillance System—Release 1," IBM T. J. Watson Research Center, *Proceedings of the ACM SIGMM 2004 Workshop on Effective Telepresences*, ETP 2004, Oct. 15, 2004, New York, NY.

Arun Hampapur, et al., "S3: The IBM Smart Surveillance System: From Transactional Systems to Observational Systems," IBM T. J. Watson Research Center, *Proceedings of the IEEE International Conference on Acoustics Speech and Signal Processing*, ICASSP 2007, Apr. 15-20, 2007, pp. IV-1385-1388.

Chiao-Fe Shu, et al., "IBM smart surveillance system (S3): A open and extensible framework for event based surveillance," IBM T. J. Watson Research Center, *Proceedings of the IEEE Conference on Advanced Video and Signal Based Surveillance*, AVSS 2005, Sep. 15-16, 2005, pp. 318-323.

Lisa Brown, et al., "IBM Smart Surveillance System (S3): An open and extensible architecture for smart video surveillance," IBM T. J. Watson Research Center, *Proceedings of the IEEE International Conference on Computer Vision*, ICCV 2005, Oct. 2005.

Ying-li Tian, et al., "IBM smart surveillance system (S3): Event based video surveillance system with an open and extensible framework," *Machine Vision and Applications*, 2008, 19:315-327.

Rogerio Feris, et al., "Case Study: IBM Smart Surveillance System", in *Intelligent Video Surveillance: Systems and Technology*, by Taylor & Francis Group, LLC, 2009, pp. 47-76.

Stephen Russo, Director of Security and Privacy Technology, IBM Corporation, "*Digital Video Surveillance: Enhancing physical security with analytic capabilities*," IBM Global Services, Feb. 2008.

* cited by examiner

SYSTEMS AND METHODS FOR SAFETY AND BUSINESS PRODUCTIVITY

REFERENCE TO RELATED APPLICATIONS

This application is a continuation of, and claims priority from, U.S. Ser. No. 12/279,720, filed on Jul. 12, 2010 and issued as U.S. Pat. No. 8,013,738 on Sep. 6, 2011, which itself is a national stage application of, and claims priority from, PCT Ser. No. PCT/US07/80488, filed on Oct. 4, 2007, the entirety of both of which are hereby incorporated by reference herein.

FIELD OF THE INVENTION

The present invention is generally related to security and surveillance systems. More specifically, this invention relates to an intelligent security and surveillance system having alerts correlated using sensory data from one or more sensors, the sensory data weighted by attribute data representing information about the source of the sensory data. The present invention may be used to help fight crime and help ensure safety procedures are followed.

BACKGROUND OF THE INVENTION

As citizens of a dangerous world, we all face security and safety risks. Every day, 30 people die by gunshot in the U.S.—one every 48 minutes. A police officer dies from a gunshot wound every ten days. An intelligent security and surveillance system may save lives.

Vandalism and damage to property decreases property values. One study conducted by the London School of Economics found that "a one-tenth standard deviation increase in the recorded density of incidents of criminal damage has a capitalized cost of just under 1% of property values, or £2,200 on the average Inner London property" (Steve Gibbons, The Costs of Urban Property Crime, 2003). An intelligent security and surveillance system may prevent such vandalism.

Every year from 1996-2005, over a million motor vehicles were stolen every year. That corresponds to one car stolen every 26 seconds somewhere in the United States. In 2004, the value of stolen motor vehicles was $7.6 billion and only 13% of thefts were cleared by arrests (Uniform Crime Reports, 2006). An intelligent security, surveillance, storage, and alerting system may help prevent stolen cars, and may identify stolen vehicles and hence aide in the apprehension of car thieves. Unfortunately, no existing surveillance system has the intelligence to correlate information about vehicles or has the connectivity to national, international, state, or local law enforcement databases.

Violence in schools and on college campuses continues to rise, and has increased concern among students, parents, and teachers. A shooting at Virginia Tech University in 2007 resulted in the killing of 32 people and injured 24 others. In 2005, a professor at MIT was shot four times in a parking lot on MIT's campus. In September 2007, two students were shot by a fellow student at the Delaware State University. Shootings on college campuses are increasingly becoming a common concern. An intelligent security and surveillance system on college campuses may thwart future shootings.

Therefore, as recognized by the present inventors, what are needed are a method, apparatus, and system of alerting that weights input data from disparate systems to lower false alarm rates and to filter out unwanted, spurious, or intentionally distracting information.

It is against this background that various embodiments of the present invention were developed.

BRIEF SUMMARY OF THE INVENTION

One embodiment of the present invention is a video surveillance, storage, and alerting system having the following components. One or more surveillance cameras capture video data having attribute data, the attribute data representing importance of the surveillance cameras. One or more video analytics devices process the video data from one or more of the surveillance cameras and detect primitive video events in the video data. A network management module monitors network status of the surveillance cameras, and the video analytics devices, and generates network events reflective of the network status of all subsystems. A correlation engine correlates two or more primitive video events from the video analytics devices weighted by the attribute data of the surveillance cameras used to capture the video data, and network events from the network management module weighted by attribute data of device corresponding to the network event. An alerting engine generates one or more alerts and performs one or more actions based on the correlation performed by the correlation engine.

Another embodiment also includes a normalization engine for normalizing the primitive events from the video analytics devices and the network management module.

Another embodiment also includes a privacy filter for filtering out primitive events normalized by the normalization engine based on a set of privacy rules.

Another embodiment also includes a business filter for filtering out primitive events normalized by the normalization engine based on a set of business rules.

Another embodiment also includes a compound event detection module for detecting compound events composed of two or more primitive events.

Another embodiment also includes an event correlation module for correlating the primitive events and the compound events across time.

Another embodiment also includes an event correlation module for correlating the primitive events and the compound events across space.

Another embodiment also includes a rules engine for evaluating one or more rules based on the correlation performed by the correlation engine.

Another embodiment also includes a learning engine for generating one or more new rules based on the primitive events correlated by the correlation engine and the alerts generated by the alert engine.

Other embodiments of the present invention include the methods corresponding to the systems above, the apparatus corresponding to the systems above, and the methods of operation of the systems described here. Other features and advantages of the various embodiments of the present invention will be apparent from the following more particular description of embodiments of the invention as illustrated in the accompanying drawings.

DETAILED DESCRIPTION OF THE INVENTION

Figure 1:
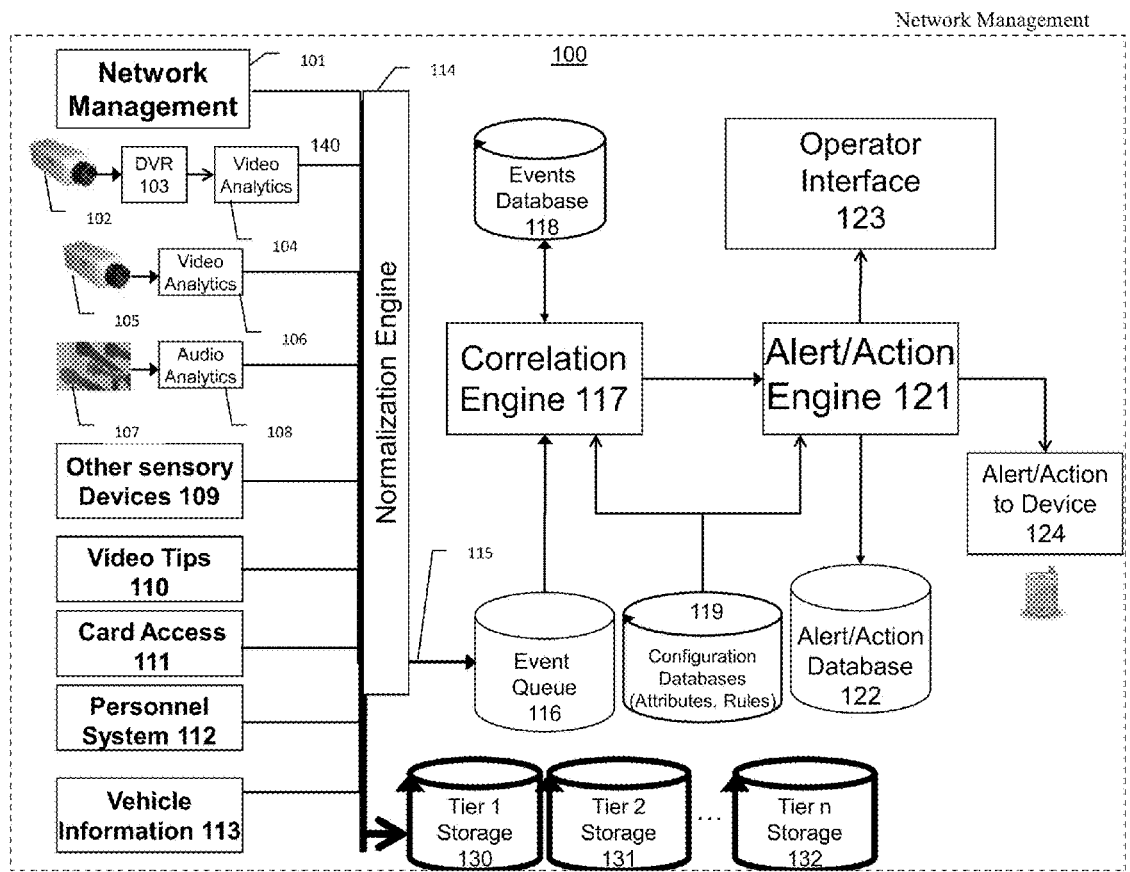
FIG. 1 illustrates a system architecture for a video surveillance, storage, and alerting system according to one embodiment of the present invention.

The present invention provides a system, a method, and an apparatus for surveillance, storage, and alerting. The present invention collects, stores, and correlates data from various sensory devices (such as video data from video cameras), as well as meta-data about the collected data, and generates one or more intelligent alerts based on meta-data and attribute data of the devices used to detect the meta-data.

Definitions

As used herein, the term "meta-data" shall designate data about data. Examples of meta-data include primitive events, (including video and audio events), compound events, meta-data extracted from video tips, network management events, and vehicle information. Meta-data also includes compound events and correlated events, defined below. Meta-data also includes information added manually by a human reviewer, such as a person who reviews a video tip, or a transcriber of a video speech.

As used herein, a "primitive event" is an atomic, indivisible event from any subsystem. Primitive video events are events that have been detected in the video, such as a people entering a designated area, vehicle driving the wrong way in a designated lane, or a package left behind in a given area. Primitive audio events include events that are detected in audio data, such as gunshot events, a person screaming, glass breaking, etc. Meta-data extracted from video tips gives rise to video tip events. The network management module generates network events corresponding to network occurrences, such as a camera losing network connection, a storage device going down, etc. Vehicle events are generated from license plates detected on vehicles, and may include information retrieved from one or more law enforcement databases. Legacy and other systems also give rise to primitive events. For example, a card access system generates a "swipe card detected" event with the corresponding unique card number whenever a card is swiped.

Primitive events may be generated automatically by various sensory devices, or may be generated in software based on data from the sensory devices. For example, a camera may generate an event corresponding to the presence of a person. In another example, a gunshot detection component may generate a primitive event indicating that a gunshot was detected and the gunshot's estimated location. The primitive events are configurable by a system administrator. The system administrator may customize the types of primitive events that are activated and recorded.

In one embodiment, a human operator adds meta-data and thereby generates primitive events. For example, a human operator may add meta-data indicating, "suspicious activity was observed at this location."

As used herein, "compound events" shall include events that are composed of one or more primitive events. An example of a compound event is tailgating. A tailgating event consists of a person entering a designated area (primitive event) when no corresponding swipe/access card is detected (another primitive event).

As used herein, "correlated events" shall include primitive and/or compound events that have been correlated across either space or time. An example of a correlated event is the same car (based on its license plate or vehicle properties) detected loitering in the same location across several days. Another example of a correlated event is the same person (based on his or her swipe card number) allowing tailgating behind him or her on more than one occasion.

As used herein, the term "attribute data" shall designate data about devices or sources (such as sensory devices), such as the quality of the data produced by the sensory device, the age of the sensory device, time since the sensory device was last maintained, integrity of the sensory device, reliability of the sensory device, and so on. Attribute data has associated weights. For example, maintenance attribute data would have a lower weight for a camera that was not maintained in the last 5 years compared to a camera that is regularly maintained every 6 months. Attribute data includes "attributes," which are attributes of the sensory devices, and their associated "weights, or weight functions" which are probabilistic weights attached to data generated by the sensory devices. For example, an attribute would be "age of the device," and an associated weight function would be a function decreasing with age. Some weights may also change with external events, such as maintenance, time, and so on. For example, a weight associated with a camera may go down if the camera was not maintained for a period of time and go back up after the camera was maintained. Attribute data may be determined by a system administrator, and/or determined heuristically.

In the case of video tips, attribute data refers to data about the source of the video tips. For example, a video tip from an anonymous submitter will have different weights corresponding to the attribute data than a video tip submitted by a registered student with the student using his or her full name and ID number.

Attribute data is stored with the sensory data, and corresponds to the attribute data of the sensory device that captured the sensory data. For example, the quality of the camera (attribute data) that was used to acquire the video data is stored with the video data.

Meta-data (primitive events, compound events, correlated events, etc.) and attribute data are used throughout the present invention. Meta-data in the form of primitive events is used to detect compound events of higher value. Primitive and compound events are correlated across space and time to generate additional meta-data of even higher value. The events are weighted according to the attribute data corresponding to the sensory devices that generated the events. Primitive, compound, and correlated events may trigger one or more intelligent alerts to one or more destinations. The meta-data is also used for forensic analysis to search and retrieve video data by event. Finally, meta-data and attribute data are both used for event correlation, for network management, and for hierarchical storage management of the video data.

System Architecture

One embodiment of the present invention is a system, a method, and an apparatus for video surveillance, storage, and alerting. FIG. 1 shows an example of a system architecture 100 of one embodiment of the present invention. A network management module 101 monitors the health, status, and network connectivity of all components and subsystems of the system. (The dashed line represents the network management module monitoring the entire system.) The network management module monitors not only the devices, such as the surveillance cameras, but also monitors the functional blocks such as the correlation engine for operation. The network management module generates network events reflective of the network status of all subsystems. For example, the network management module sends a network event indicating "connection lost to camera 1" when the network management module detects a network connection problem to camera 1. The network management module is described in greater detail with respect to FIG. 3.

Analogue surveillance camera 102 captures video data, which is digitized by DVR 103. Video analytics device 104 detects primitive video events ("meta-data") in the video data. The primitive video events, represented by line 140, may include such events as "person detected," "vehicle detected," etc., and are explained in detail below. Digital surveillance camera 105 (which could be an IP camera) also captures video data. Video analytics device 106 detects primitive video events ("meta-data") in the video data. Although only two surveillance cameras are shown, the present invention may be applied to any number and combination of analogue and digital surveillance cameras. The video analytics devices may consist of software running on a general purpose hardware device. Audio sensory devices 107 capture audio data, which is processed for primitive audio events by audio analytics device 108. Examples of primitive audio events may include gunshot events, people screaming, glass breaking, etc. One or more additional sensory devices 109, such as a temperature probe (not shown), pressure probe (not shown), chemical probe (not shown), etc. provide sensory data that complements the video and audio data.

A video tip module 110 receives "video tips" from one or more external sources (which could be anonymous or non-anonymous, the externals sources are not shown in FIG. 1), extracts meta-data and attribute data from the video tips, and generates tip events based on the extracted meta-data and attribute data. A "video tip" is a tip consisting of a video clip, an audio clip, a still image, or other multimedia information which can be submitted from a cell phone, or any portable camera. Tips, that is, information from informants, are an important source of data. With the proliferation of video phones, tips are an increasingly important source of information as multimedia information is captured at the scene of a crime by well-meaning citizens and/or police officers. Video tips may be video clips recorded by video phones (cell phones with integrated cameras), digital cameras, handheld video cameras, etc. The video tip module is described in greater detail with reference to FIG. 6.

Numerous legacy systems, such as card access system 111, personnel system 112, etc. may be integrated into system 100 by the use of an appropriate normalization engine (to be described below). These legacy systems provide important "meta-data" events, such as "person A swipes into building B," etc. The legacy systems also provide important information to the correlation engine, for example, "person A is a registered student," "person B is a faculty member," etc.

Vehicle information module 113 retrieves information about a vehicle detected in the video data based on the detected vehicle's license plate, and generates vehicle events based on the information retrieved about the vehicle. If a vehicle is detected in the video by video analytics device 104 or 106, vehicle information module 113 retrieves information about the vehicle from one or more law enforcement databases (not shown in FIG. 1) based on the detected vehicle's license plate number. The vehicle information module is described in greater detail in relation to FIG. 5.

A hierarchy of two or more data storage devices 130, 131, 132 stores the video data from the surveillance cameras, audio data from the audio sensory devices, data from other sensory devices, video tips from the video tip module, vehicle information, and data from other legacy systems. (The hierarchy of data storage devices is connected to the surveillance cameras, the audio sensory devices, and the video tip module via a network.) A hierarchical storage manager (not shown) manages storage and cascade of the data among the storage devices. The hierarchical storage manager is described in greater detail in relation to FIG. 4.

A normalization engine 114 receives primitive events such as primitive event 140, and normalizes the primitive events into a standardized format the system can recognize, identified as normalized event 115. Although one normalization engine is illustrated in FIG. 1 for clarity, in practice each type of sensory device may have its own normalization engine. For example, there may be one normalization engine for normalizing events from video analytics devices, another normalization engine for normalizing events from audio analytics devices, another normalization engine for normalizing events from legacy systems such as the card access system and the personnel system, etc. Alternatively, one normalization engine as shown in FIG. 1 may have multiple modules for each type of sensory device. The normalization engine(s) receives input(s) from the sensory device(s) and generates corresponding normalized events for processing by the correlation engine. A normalization engine is not necessary for those sensory devices that produce primitive events in the standardized system format. Normalized events 115 are placed in event queue 116 for processing by correlation engine 117.

Correlation engine 117 takes events from event queue 116 and performs a series of correlations (across both space and time) on the events that are described in greater detail below. After the events are picked off from the event queue 116 by the correlation engine, they are placed in permanent storage in the events database 118 (an illustrative structure of this database is described below). The correlation engine 117 also queries the events database 118 for historical events to perform the correlations described below. The correlation engine also receives input from the configuration database 119 which stores configuration information such as device "attribute data," rules, etc. The correlation engine 117 correlates two or more primitive events, combinations of primitive events and compound events, and combinations of compound events. Primitive events include primitive video events from the video analytics devices, audio events from the audio sensory devices, tip events from the video tip module, network events from the network management module, or vehicle from events the vehicle information module. The correlation engine is described in greater detail in relation to FIG. 2.

Alert/action engine 121 generates one or more alerts and performs one or more actions 124 based on the correlated events from the correlation engine. Examples of alerts include an email to a designated individual, an SMS message to a designated cell phone, an email to an Apple iPhone® or other multimedia-rich portable device, or an alert displayed on the operator's interface 123. Examples of actions include "turn on lights," "turn down thermostat," etc. Detailed examples of possible actions that may be performed by the alert/action engine 121 are described in greater detail below. Alert/action engine 121 stores all alerts/actions that were performed in alerts database 122.

Cameras used in the present invention may be digital IP cameras, digital PC cameras, web-cams, analog cameras, cameras attached to camera servers, analog cameras attached to DVRs, etc. Any camera device is within the scope of the present invention, as long as the camera device can capture video. Some cameras may have an integrated microphone; alternatively, as shown in FIG. 1, separate microphones may be used to capture audio data along with video data. As used herein, the terms "video," "video data," "video source," etc. is meant to include video without audio, as well as video with interlaced audio (audiovisual information).

The system diagram shown in FIG. 1 is illustrative of only one implementation of the present invention. For example, the events database and the video data may be stored on dedicated storage devices. Alternatively, a common server may house the events database and the video data.

Correlation Engine

Figure 2:
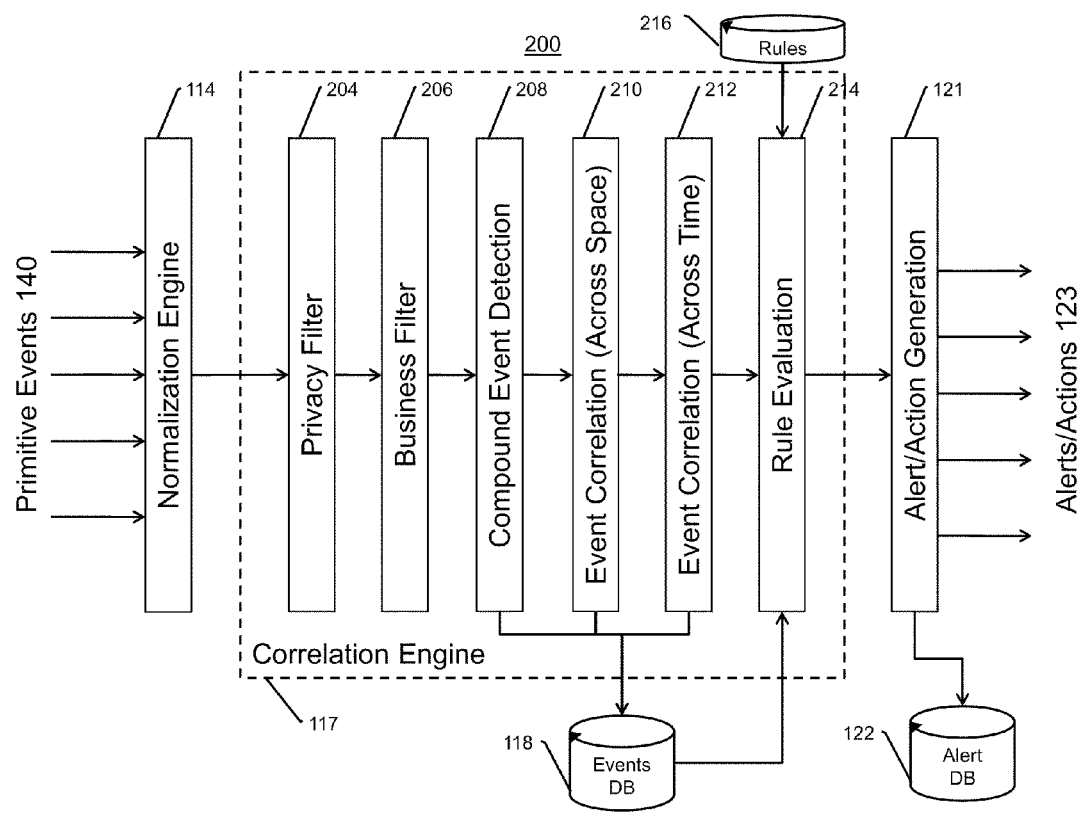
FIG. 2 illustrates an architecture of a correlation engine according to one embodiment of the present invention.

FIG. 2 shows an architecture 200 of the correlation engine 117 according to one embodiment of the present invention. Primitive events 140 are received from one or more sensory devices, and are normalized into a standard format by the normalization engine 114 (which could be a separate normalization engine for each device type). A privacy filter 204 filters out primitive events based on a set of privacy rules. The set of privacy rules are defined by a system administrator, and are designed to protect the privacy of individuals where the present invention is being used. The set of privacy rules instruct the system which events to store, and which events to ignore. For example, in a university setting with a camera in a computer lab, a possible privacy setting may instruct the system to ignore all primitive events between 9 AM and 5 PM. That is, the system would not record or process primitive events of people entering the computer lab during those hours. In another example in a university setting with swipe card access and associated video, another privacy setting may instruct the system to disregard students swiping into their own dormitory during certain hours, but log and record students from other dormitories. (The policy for recording video data is independently set from this privacy filter, so that video data may be recorded during those hours, but primitive events would not be stored or analyzed. Video data indexed by primitive events is more intrusive on privacy than merely recording un-indexed video data.) This privacy filter aims to strike a balance between, for example, student safety and student privacy by disregarding events during normal school hours or disregarding events of a certain type. Business filter 206 filters out primitive events based on a set of business rules. The set of business rules are defined by a system administrator, and are designed to customize the system to the business processes in which the present invention is being used. The set of business rules instruct the system which events to store, and which events to ignore to align the present system with business processes. For example, in a corporate setting, a business rule would instruct the system to ignore all primitive events of a certain type (e.g., motion) in the data center during hours during which the data center is scheduled to be serviced. This business filter eliminates unnecessary false alarms by disregarding events when they are not significant based on normal business processes.

After the primitive events have been filtered by privacy filter 204 and business filter 206, they are evaluated by compound event detection module 208 for presence of compound events. An example of a compound event is "tailgating." A tailgating compound event occurs when certain primitive events are detected. That is, a tailgating compound event occurs when a single swipe card event from the legacy card access system 111 is detected, while two or more people are detected entering the facility on a camera that is directed at the entrance corresponding to the swipe card's location. Compound events are defined by the system administrator as a combination of two or more primitive events. Compound events may include primitive events from one sensor, from two or more sensors, or even from two disparate types of sensors, as in the tailgating example above.

After compound events have been detected from primitive events, the primitive and compound events are correlated across space by event correlation module 210. Event correlation across space module 210 looks for events occurring "substantially simultaneously" or in close time proximity, across multiple sensors of varying types located across space. Examples would include multiple tailgating events across a facility, or a loitering of two vehicles in different parts of a campus. Next, the primitive and compound events are correlated across time by event correlation module 212. Event correlation across time module 212 looks for historical event correlations between events detected now, and events that occurred historically. Examples would include the same person (as identified by their swipe card) allowing tailgating on multiple occurrences, the same vehicle (as identified by its license plate, or its make/model/color) loitering outside a college dormitory, or the same person (as identified by a log) stopped multiple times by the security.

At each detection of a compound event by compound event detection module 208, and each correlation across both space and time by event correlation modules 210 and 212, the compound events and correlated events are stored in events database 118. Rule evaluation module 214 evaluates a set of rules from rules database 216 based on the events stored in events database 118. Examples of event correlation and rule evaluation are described in greater detail below.

Finally, alert/action engine 121 issues one or more alerts or performs one or more actions 123 based on the rules evaluated by the rule evaluation module 214. The alerts/actions are stored in alerts database 122. One of ordinary skill will recognize that the architecture shown in FIG. 2 is illustrative of but one correlation engine architecture and is not intended to limit the scope of the correlation engine to the particular architecture shown and described here. A more detailed mathematical explanation of the operation of one embodiment the correlation engine is described in greater detail below.

Network Management

Figure 3:
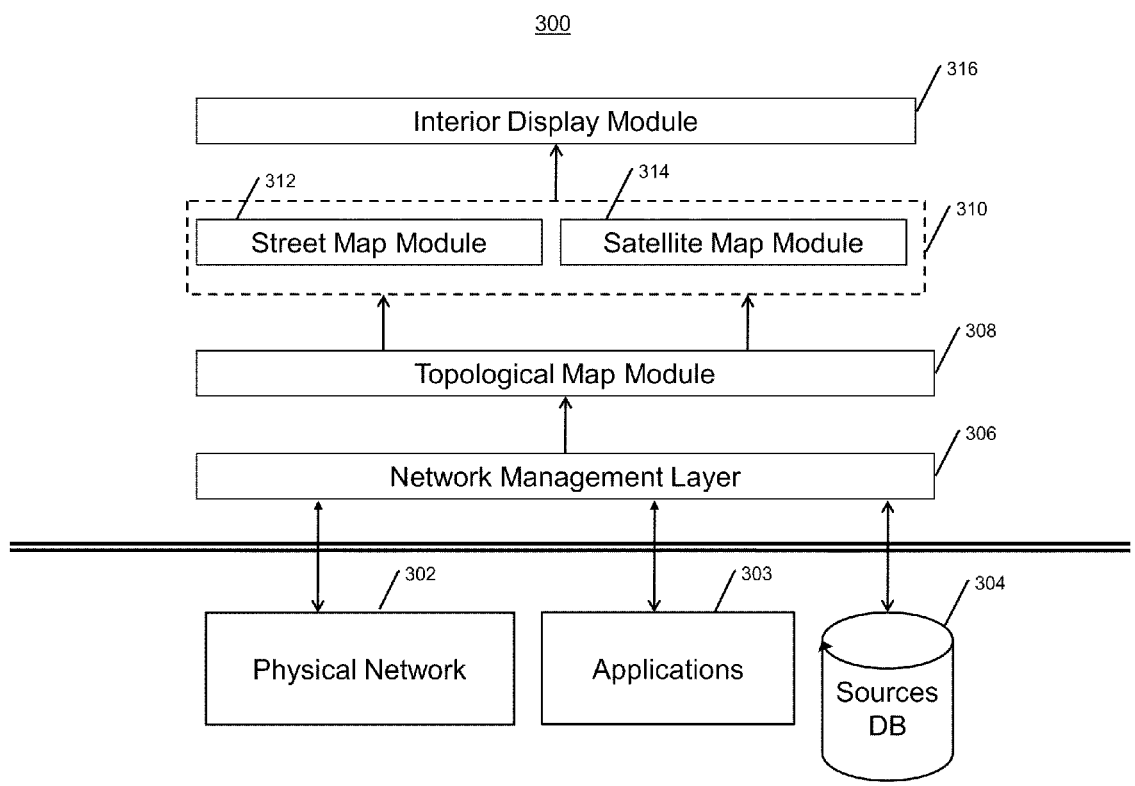
FIG. 3 illustrates an architecture of a network management module in accordance with one embodiment of the present invention.

FIG. 3 shows an architecture of the network management module 101 according to one embodiment of the present invention. Network management layer 306 monitors the status of devices on the physical network 302 as well as the status of applications 303, and keeps a record of device and application status in sources database 304. Network management layer 306 detects all devices, including network cameras, servers, client machines, storage devices, etc. that are on the network. Topological map module 308 generates a topological network diagram (an example illustrated in FIG. 7) of all networked devices. Physical map module 310, which includes street map module 312 and satellite maps module 314, generates a physical map of the area being monitored. The physical map may be represented by a street map (as shown in FIG. 8A) or a satellite map (as shown in FIG. 8B).

All surveillance cameras and audio sensory devices (such as gunshot detectors) are displayed as icons on the physical map. "Plumes" (arcs of circles) are used to represent physical areas of coverage of the cameras, while "concentric circles" (or elipses) are used to represent physical areas of coverage of audio devices (such as gunshot detectors). The physical area of coverage for a surveillance camera is the physical area of the facility that is within the field of view of the camera. Since this value depends on resolution, as well as other camera properties (for example, a "fish-eye" camera has 180° of coverage), these values are obtained from the camera manufacturer and maintained as device "attribute data" (described below). Physical area of coverage for a gunshot detector is the physical area over which the gunshot device can accurately and reliably detect a gunshot. The physical area of coverage is obtained from the gunshot detector manufacturer and maintained as device "attribute data" (described below). Typical gunshot detectors have ranges on the order of approximately 0.25 to 1 mile radius, while typical cameras have ranges of several tens to hundreds of feet.

Figure 9:
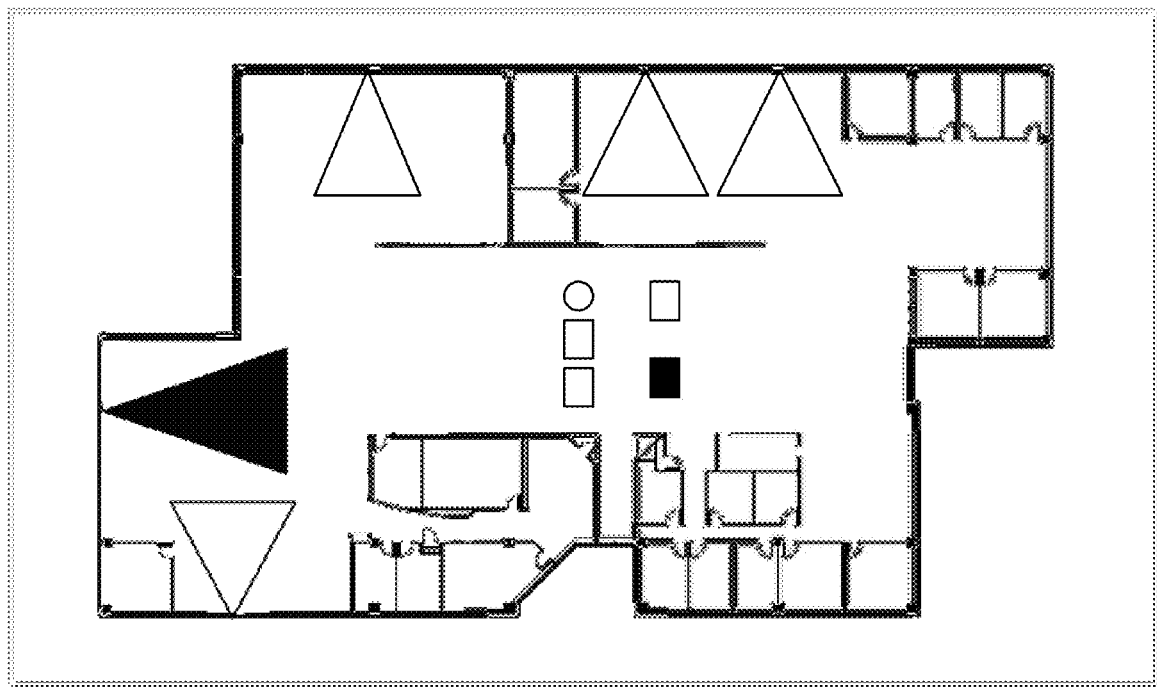
FIG. 9 illustrates an interior map of a network as monitored by the network management module in accordance with yet another embodiment of the present invention.

Finally, interior display module 316 displays interiors of buildings and shows devices and areas of coverage inside buildings. Interior display module 316 is activated whenever an operator zooms into a building while in either the street view or the satellite view. The interior display module shows which interior portions of a building are covered (or not covered) by the sensory devices, such as video cameras. Analogously to the street view and the satellite view, the interior display shows icons placed on the floor plan corresponding to the locations of the cameras and plumes to represent areas of coverage of the surveillance cameras. (FIG. 9 shows an example of an interior display view.)

Figure 7:
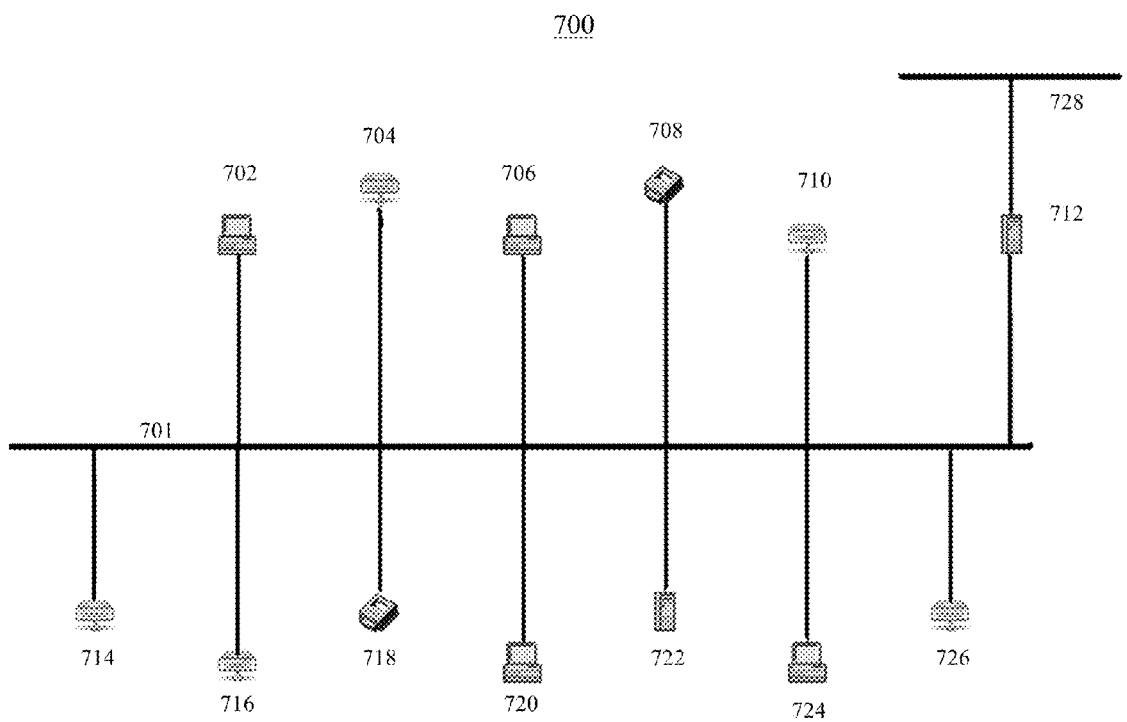
FIG. 7 illustrates a topological map of a network generated by the network management module in accordance with one embodiment of the present invention.
Figure 8A:
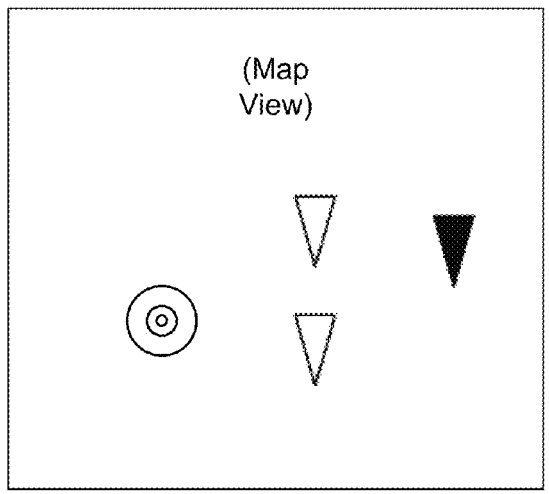
FIG. 8 illustrates a physical map of a network as monitored by the network management module in accordance with another embodiment of the present invention, with FIG. 8A showing a street map view and FIG. 8B showing a satellite view.
Figure 8B:
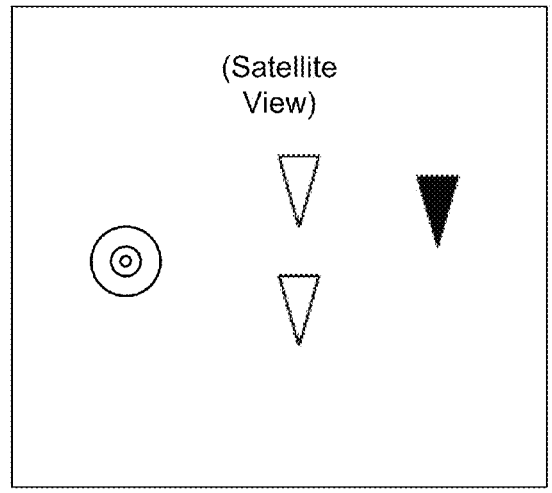

FIG. 7 shows an illustrative topological display as generated by topological map module 308 of FIG. 3. The display shows an interface to view and manage topological display of all networked devices. The display shows IP addresses of all devices, as well as any other device information, such as MIB information obtained from SNMP agents that reside on the devices. The icons also show the network status of all devices (whether the device is connected, disconnected, awake, asleep, etc.). The icons blink, change color, or in some other way indicate a disconnected device or no signal to the device. The lines connecting the devices to the backbone of the network may optionally show status of the interconnections by displaying maximum (e.g., 100 MBs, 10 MBs, etc.) and current bandwidth (whether busy, congested, free, etc.). The lines may optionally blink, change color, or otherwise indicate when there is no network connectivity and/or bandwidth is insufficient for video streams.

The display automatically refreshes the view of the network and updates the display of the network. For example, if a camera is added, the refresh cycle automatically displays the new network with the new camera. Any new devices plugged into the LAN are automatically displayed on the GUI. If an existing healthy device goes off-line, then its icon is represented in a different state (for example, a healthy device in green and an off-line device in red).

FIG. 8 shows an illustrative physical map display as generated by physical map module 310 of FIG. 3. FIG. 8A shows an illustrative street map view as generated by street map module 312 of FIG. 3, while FIG. 8B shows an illustrative satellite map view as generated by satellite map module 314 of FIG. 3. The mapping data may be obtained from a mapping service, such as Google Maps® or Microsoft Virtual Earth®.

The physical map provides a configuration interface to view and manage physical locations of all cameras, gunshot devices, other sensory devices, storage devices, and any other devices and subsystems. The interface provides a mechanism to input locations of all cameras, gunshot detectors, other sensory devices, storage devices, and any other devices and subsystems of the network. A device is selected from the topological map by clicking on the icon or selecting from a list. Physical locations of the device are selected on the physical map by clicking on the physical location, by entering the street address of the device, or by entering GPS co-ordinates (latitude and longitude) of the device. The physical locations of the device are saved in the sources database 304.

Most mapping tools have good resolution up to the street or building level, but cannot zoom in past this level of detail. According to the present invention, finer detail may be shown on a floor plan, or a 3D interior map of the building. The floor plan view or 3D interior map is automatically displayed when an operator attempts to zoom into a particular building. For example, a bitmap of the building floor plan may be displayed to show camera locations inside a building when a user clicks on the building. As described previously, the interior display module 316 of FIG. 3 generates and controls the interior map. FIG. 9 shows an illustrative floor map as generated by interior display module 316. The present invention is not limited to interior display in a floor map view as shown here. The interior may also be displayed in a 3D map (not shown), or another alternative representation of the interior of a building.

Heirarchical Storage Manager

During daily operation of the present invention, large amounts of data are generated. For example, a typical 3 Megapixel digital surveillance camera generates images of approximately 280 Kbytes per frame. If this camera were running at 5 frames per second, it would generate approximately 60 GB per day. If an organization wanted to archive the data for one month, it would take approximately 1.8 TB, and if the organization wanted to archive the data for one year, it would take approximately 22 TB. In a typical application having 100 surveillance cameras around a particular facility, this translates into approximately 6 TB per day, or approximately 180 TB per month, or over approximately 2,000 TB per year! Ideally, requested data should be retrieved at the fastest rate and this is possible only if all of the data is available on high-speed devices at all the time, but this is beyond the ability of most organizations. The Hierarchical Storage Manger (HSM) plays an important role in providing large amounts of permanent data storage in a cost-effective manner. That is, data files which are frequently used are stored on higher cost storage medium (like cache discs) but are eventually migrated to lower cost storage medium (like tapes or networked storage) if the data files are not used for a certain period of time (or as per the defined migration policy). When a user requests a data file, which is on a slower storage medium (such as tape), it is automatically made available, and is moved to a faster storage medium if it is frequently accessed by the user.

The main benefits of the Hierarchical Storage Manager include the following: 1) Support for rule-based migration and archive policy—once the rules and policies have been defined, HSM manages everything automatically. Cascading of data from higher storage medium to lower storage medium and vice-versa is automated based on policies defined. 2) Based on inputs provided by the system, HSM builds its own rules and policies—inputs can include storage limit threshold values (e.g., when the down-cascading has to be performed). 3) HSM reduces the total storage cost as data accessed less frequently resides on lower cost storage. 4) The performance is improved as unused data is moved to lower level storage devices and frees up higher level (faster) storage devices, thus increasing overall system performance) 5. HSM cuts administrator time by not requiring manual data archiving, deletion to free up disk-space, and manual data retrieval. 6) Disaster management is supported by automatic online data backups. 7) Data is automatically cascaded up when the system accesses data. 8) The total amount of stored data can be much larger than the capacity of the disk storage available, since rarely-used files are cascaded down to low-cost storage media.

The storage hierarchy may include hard disk, optical disk, magnetic disk, flash memory, tape memory, RAID array, NAS (Network Attached Storage), SAN (Storage Area Network), or any other physical or virtual storage media. An illustrative data storage hierarchy used by the HSM module may be:
1. Local RAID array (magnetic hard disk)
2. Networked disk array (SAN, NAS, etc.)
3. Tape array (e.g., Automated tape library)
4. Tape stored on the shelf after tape array is full The following example is directed to video data, but the principles of the present invention may be applied equally to other data being processed by the system, including audio data, video tips, as well as other data and related meta-data. Therefore, the use of the term "video data" is not intended to limit the application of the HSM module to only video data, and is used illustratively only.

Video data may be cascaded down the storage hierarchy based on its importance (Y). The importance (Y) may be calculated as a weighted average of the attributes of the video data (including attributes of the device used to capture the video data). Examples of attributes of the video data include, but are not limited to, the following:
1. Resolution of the video data (R)
2. Age of the camera used to capture the video data (A)
3. Time since last maintenance of the camera used to capture the video data (TM)
4. Location of the camera used to capture the video data (L)
5. Reliability of the source of the video data (whether it's a camera, anonymous video tip, etc.) (RS)
6. Time since the video data was last accessed (TS) (TS=time since data was stored if data has not been accessed yet)
7. Events detected in the video data (people detected, motion detected, etc.)
8. Time period the video data was recorded (e.g., if monitoring safety in a data center, then a period when the data center is empty or during non-working hours has lower importance)

Importance of the video data (Y) is used to cascade the video data, and may be calculated as a weighted average, as shown in Equation A.

$$Y = \sum_{i=1}^{i=N} w_i \cdot a_i \quad (A)$$

where Y=importance of the data, $a_i$=attributes of the data ($\Sigma a_i$=1), $w_i$=relative weights of the attributes ($\Sigma w_i$=1), and N=total number of attributes.

If $t_0 \leq Y \leq 1$ then data is stored in highest (first) hierarchy.

If $t_1 \leq Y < t_0$ then data is stored in second hierarchy.

If $t_2 \leq Y < t_1$ then data is stored in thrid hierarchy.

...

If $0 \leq Y < t_n$ then data is stored in lowest (last) hierarchy, where $1 > t_0 > t_1 > t_2 > ... > t_n > 0$.

For example, in a case of six attributes each weighted equally, the importance Y may be calculated as shown in Equation B:

$$Y=(L+R+A+RS+TM+TS)/6 \quad (B)$$

The preceding sample equations used to calculate the importance (Y) of video data are illustrative of but numerous such expressions, and are not intended to limit the scope of the present invention to the equations and terms shown here. Other attributes of the video data may be used to determine the importance of the video data. In addition, fewer than the attributes listed here may be used to determine the importance of the video data. Finally, an alternative expression other than a weighted average, such as a non-linear equation, may be used to determine the importance of video data from its attributes.

The video data is divided into segments. Segments may be measured in days, hours, minutes, or seconds. The system administrator selects the segment length, and the segment length determines the minimum atomic units of video data that the HSM module cascades. Each segment of video data has an associated entry in an internal HSM database. The internal HSM database keeps track of the importance of each segment of video data, and its location in the storage hierarchy, as well as its actual location within each hierarchy. An entry is stored in the internal HSM database describing the importance of each segment of the video data for each device. As illustrated in equation (A), if importance of a video segment is less than T (where T is defined by the system administrator), then that segment of video data is cascaded down to the next level. For example, if video data has an event (as recorded in the events table) and has been accessed frequently, then it has a higher importance (Y) than video data without any events. All events may not be weighted equally in determining importance (Y). If video data has an event of high importance (as recorded in the events table, such as a gunshot), then this video data has higher importance.

When a given hierarchical level becomes near full, the video segments of lowest importance are automatically cascaded to free space for new data.

For example, importance may be a function of the time since the data was last accessed. The data stored is evaluated on the basis of the age of the data, for example, if the data is more than X days old (where X is set by the administrator) and otherwise has no other attributes associated with it, and has not been accessed, then this data is cascaded to the next level of storage devices.

For example, if the video data has no primitive events detected, but has been accessed frequently, then this data will remain on the disk until X days (X is set by the administrator) of the last access time. If the video data has primitive events, but has not been accessed at all, then this data will be cascaded to the next level storage device after Y days (Y is set by the administrator) of the date of storage. If the video data has primitive events and has been accessed continuously, then this data will remain on the disk until an administrator manually forces a cascade from the disk.

In one embodiment, location of the camera used to capture video data is one factor in calculating importance of the video data. For example, if the location of a camera has high importance (for example, the data center), video from the camera will have higher importance and will be stored for a specified longer period.

In one embodiment, video data retained after the normal cascade is always (1) some amount of time before the event and (2) some amount of time after the occurrence of the event (these values are set by the administrator). For example, 5 minutes of video before an event, and 5 minutes of video after the event, are always retained along with the event.

In one embodiment, all data has an attribute that reflects when data was last accessed. Data that is recently accessed is likely to be accessed again, and thus its importance will be higher and it will not be moved to a lower hierarchy. This enables operators to retrieve data that has been recently accessed with lower delay.

Figure 4:
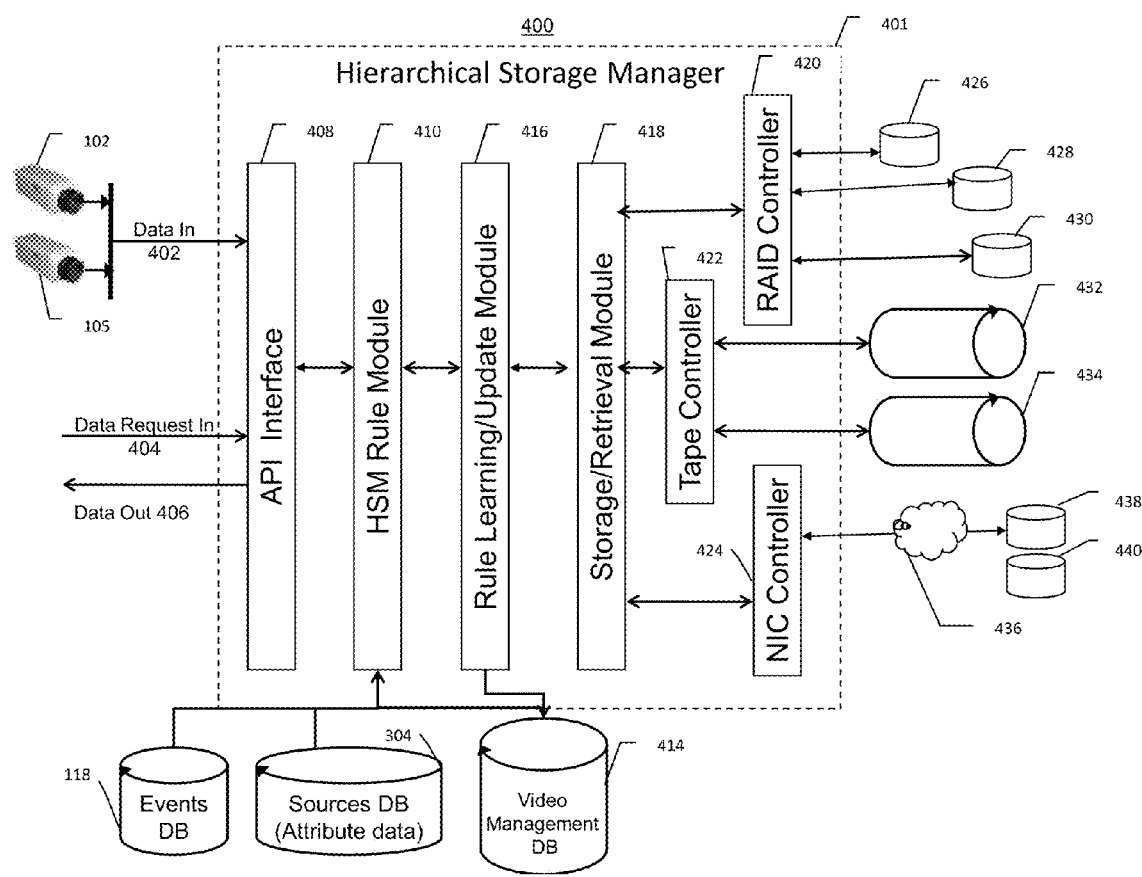
FIG. 4 illustrates an architecture of a hierarchical storage manager in accordance with one embodiment of the present invention.

FIG. 4 shows an architecture 400 for a hierarchical storage manager 401 which is used to manage the storage of video data as well as other data on the n-tiered storage configuration shown in FIG. 1 as storage devices 130, 131, and 132. (The hierarchical storage manager is not shown in FIG. 1.) Video data from cameras 102 and 105, as well as other data from other sensory devices, enters the hierarchical storage manager as data-in line 402. An API interface 408 provides a common interface to store data to, and retrieve data from, the hierarchy of storage devices. The API interface provides a standardized set of function calls when storing data, as well as when retrieving data. Examples of interface calls are shown in equations (C) and (D):

$$\text{StoreData(pointer to video data, Camera ID, Time)} \quad (C)$$

$$\text{pointer ReadData(CameraID, Time)} \quad (D)$$

In equation (C), the function StoreData stores the data referenced by pointer video data and corresponding to camera identified by CameraID and time identified by Time into the storage hierarchy. In equation (D), the function ReadData returns a pointer to video data corresponding to camera identified by CameraID and time identified by Time.

When storing data, the HSM rule module 410 determines on which storage device video data and other data should be stored based on events stored in event database 118, and configuration information ("attribute data") stored in sources database 304. The HSM rule module 410 then stores the location information corresponding to the location of the stored data in an internal database, the video management database 414. When reading data, the HSM rule module 410 determines on which storage device the data is stored by checking the video management database 414.

The HSM rule update module 416 updates the video management database 414 based on requested video data. For example, video data and other data that is more frequently accessed are moved to faster storage devices. The HSM storage/retrieval module 418 manages the actual storage and retrieval of data. The HSM storage/retrieval module 418 interfaces with RAID controller 420 to access video data from a RAID array consisting of disks 426, 428, and 430. Three disks are shown for illustrative purposes, but any number of disks is supported by the present invention. The HSM storage/retrieval module 418 interfaces with Tape controller 422 to access video data from a tape array consisting of tape drives 432 and 434. The tape controller may also interface to an Automatic Tape Library consisting of hundreds of tapes automatically managed by a robotic arm. Finally, HSM storage/retrieval module 418 may also interface with Network Interface Controller (NIC) 424 to access video data via network (such as the Internet) 436 from remote, network-attached disks, such as SAN (Storage Area Network) 438 or NAS (Network Attached Storage) 440. Two networked disks are shown for illustrative purposes, but any number of networked disks is supported by the present invention.

In one embodiment of the present invention, video data is captured and backed up continuously to a remote location. The video data may be sent via a network, such as the Internet, or a dedicated fiber optic line, to a remote, secure location. If the local copy of the data is damaged, destroyed, or tampered with, the copy in the remote location may be accessed and analyzed. All video data may be automatically archived to the remote location.

In one embodiment of the present invention, storage media 438 and 440 serve as continuous live backup of the video data and are connected by transmission media 436. Transmission media 436 may be a dedicated fiber optic line or a public network such as the Internet. Storage media 438 and 440 may be hard disk, magnetic tape, and the like.

The HSM Module provides centralized storage management operations with data migration, archiving and restoring while reducing complexity and management costs. HSM protects against data loss and other failures by storing backup, by efficient space management for data, as well as compliance and disaster recovery of data in a hierarchy of off-line storage. An intelligent data move-and-restore technique and comprehensive rule-based policy automation work together to increase data protection and potentially decrease time and administration costs.

In one embodiment, in order to preserve user data in case of hardware failure or accidental removal, files written into an HSM-managed file system are backed up continuously to an offsite location. All data is immediately compressed and backed up as soon as it is recorded to a back-up device. The back-up device is online and is always a second copy for online data. Data and backed-up data are always synchronized. A policy could be defined to force the existence of a backup of a file before the file can be migrated from a higher level to a lower level.

In order to maximize the efficiency of data management, fresh data is stored on a cache drive, which is usually a magnetic hard disk. Once data meets a predefined rule, policy, or a threshold value based on its importance (Y) as defined above, data is moved from the high-cost storage medium to a lower-cost storage medium and gradually to tapes. HSM performs these functions automatically. A system administrator can configure the rules, specify the policies, or set the threshold values for the HSM. Based on these rules and policies, migration and archiving are triggered. The rules may also be defined to move specific files, purge files, or to define the number of files to move at any one time.

The essential difference between migration and archiving is the bi-directional interface for dynamic retrieval provided by migration. Dynamic retrieval occurs when restoring the data back to disk automatically when it is accessed and made available for processing again. The ability to transfer data across the disk and tape interface in both directions is system controlled (that is, automatic). That is, migration moves data from higher cost storage medium to the immediate next low cost storage medium. Archiving, on the other hand, moves the data permanently to tapes that may be shelved away for intermittent access.

HSM Migration: Migration physically moves selected data to different auxiliary storage pools. It moves data from fast, high performance disk to slower or compressed disk, networked disk, automatic tape library, or some other slower storage pool. This results in saving space on the fast disk. Except for possible changes in access times, data that has been migrated is still fully available to any application that was able to access it before the data was migrated. Now the data will be accessible from the migrated area. If required, data will be moved from slow disk to fast disk. Migration operations are performed automatically based on default rules. (The administrator can override rules so that data may be migrated as required). Policies are defined for data migration. Migration of data is done at a predefined level (e.g., migration is may be done at a camera- or folder-level, but not at file-level) to maintain application transparency. Migration of data is also done at a predefined time interval (e.g., every minute of data is always processed together as one segment). Rules can also be defined for avoiding migration of specific files. For example, a segment of video data that has an event will be stored longer on higher cost storage medium than a segment with no events. As explained earlier, migration may be based on the importance of data, and a sample calculation of importance was shown in Equations (A) and (B). The equation by which importance of video data is calculated is not predetermined, and may be customized by the system administrator. The migration criteria are given as inputs to the HSM module.

An illustrative migration process includes the following steps:
1. Identify segments of data suitable for migration
2. Establish suitable migration criteria based on the importance (Y) of the video data. Criteria are the rules, weights, or policies to determine which data qualifies for migration.
3. Establish a migration policy, which triggers data migration from the high-cost storage to low-cost storage and vice versa, such as nightly, weekly, monthly, when the disk is 90% full, etc.
4. Add the migration jobs to the scheduler HSM Archiving: Archiving creates an interface from disk to "shelved" tape allowing moving of inactive data to a less expensive form of storage. Archiving selects infrequently used segments of video data, saves them to tape, and then deletes them from disk. This action frees up storage space. Archiving of data to tape saves disk space on primary (fast) disk because it moves the data to a less expensive form of storage. The HSM Module keeps track of information about the segments of video data that are archived. When a segment of video data is recalled, the tape must be retrieved from the shelf and the file is restored to the disk. Threshold values or policies based on the importance (Y) of the video data are defined by the administrator to start archiving. Archiving of data is done at specified levels (e.g., archiving is done at folder-level or camera-level, but not at file-level).

Sample archiving process includes the following steps:
1. Identify segments of data suitable for archiving
2. Establish suitable archive criteria based on the importance (Y) of the video data
3. Establish an archive policy, which triggers data archiving to tapes, such as weekly, monthly, when the disk is 90% full, etc.
4. Establish a media policy. The media policy consists of information about the tape media, which are inputs to the archiving policy, and also prevents erroneous use of active media prior to expiration.
5. Archive logs HSM Rules Engine: When a system state matches the predefined policy, the appropriate migration or archiving action is triggered. A system state such as a disc capacity crossing a threshold value may trigger cascading of data to the next level in the hierarchy. An HSM internal database for managing data on the storage medium is maintained for all the data that is stored, migrated and archived. This information keeps track of the data's location, archive status, frequency of use and any other attributes that are relevant to the HSM Module.

HSM Audit Trails: Audit trails are maintained by the HSM Module. Data privacy is a major cause of concern, and the audit trail keeps track of who has accessed each segment of video data and when. The audit trail includes information about which data segments were accessed, the type of data accessed, time at which the data was accessed, by whom the data was accessed, and other parameters. Each time anyone accesses a video segment from the HSM Module, audit information is stored in an audit database.

Some sample HSM user roles which may be used for HSM auditing purposes include the following:
1. Administrator
2. Forensic analyst(s)
3. Operators
4. Management
5. Other authorized personnel (customer-specific)
6. Correlation engine (This is an application-internal user which is going to access the data most frequently and perhaps continuously. For example, when a suspicious vehicle is detected in a parking lot and the correlation engine has a predefined rule to search for all other instances where this camera detected the same vehicle, and where this data was not previously stored as metadata.)

In one embodiment, the HSM Module may provide seamless compression and encryption services for data on the fly.

Vehicle Information Module

Figure 5:
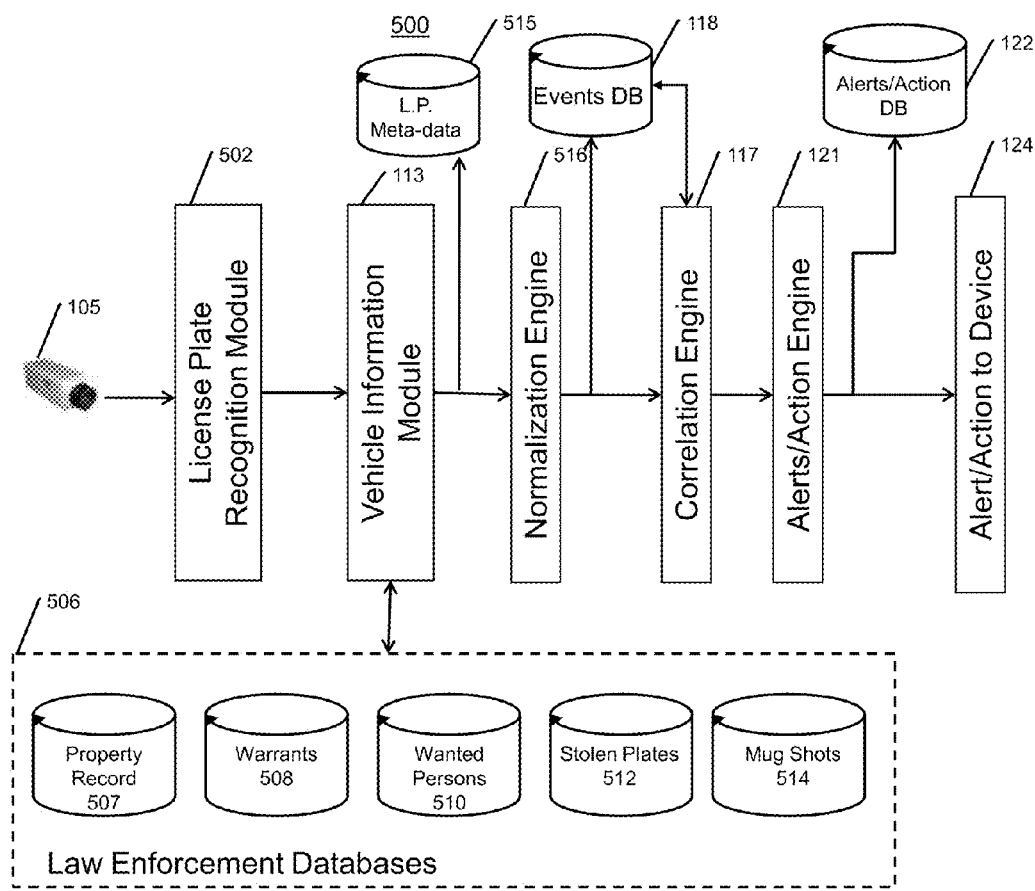
FIG. 5 illustrates an architecture of a vehicle information module in accordance with one embodiment of the present invention.

FIG. 5 shows an architecture 500 of one embodiment of the present invention in which the vehicle information module is used to retrieve information about vehicles detected in the video data. Video data from camera 105 is processed by license plate recognition module 502 to extract a license plate string and a state of the license plate (e.g., Florida, Michigan, etc.). In cases in which multiple hypotheses are returned by the license plate recognition module (such as 01234 and O1234), both possible results are queried. License plate strings and states extracted by the license plate recognition module 502 are input into the vehicle information module 113, which queries one or more law enforcement databases 506 with the license plate and state as search strings. Numerous law enforcement databases are envisioned to be within the scope of the present invention, including warrants database 508, wanted persons database 510, stolen plates database 512, mug shot database 514, and any other law enforcement database that may be available, including FBI, Interpol, state and local databases. The vehicle information module first queries a property record database 507 for the license plates detected by the license plate recognition module 502, to determined a registered owner of the vehicle. The vehicle information module then queries the other law enforcement databases, such as the warrants database 508, the wanted person database 510, or the mug shot database 514 for the registered owner based on the results from the query to the property record database 507. The vehicle information module 113 may also query certain databases directly with the recognized license plate, such as the stolen plates/stolen cars database 512.

The present invention may query FBI, Interpol, state, and local databases. The present invention may query police, sheriff, and other law enforcement databases. The present invention may query for recent crimes, related arrests, outstanding or historical warrants, and past convictions. The present invention may query the FBI Most Wanted, as well as Interpol Wanted Fugitives list.

After any relevant information is retrieved from the law enforcement database(s) 506, the information is passed to a vehicle information normalization engine 516, which may be a component of normalization engine 114 of FIG. 1, which translates the vehicle information into appropriately formatted events that the correlation engine 117 can process. The vehicle events are stored in events database 118, and fed to correlation engine 117. Correlation engine 117 then performs filtration, compound event detection, space-and-time event correlation, and rule evaluation as described in greater detail in relation to FIG. 2, and stores any results in events database 118. Finally, as previously described, alerts/action engine 121 generates one or more alerts and/or triggers one or more actions 124 based on triggers from the correlation engine, and stores the generated alerts/action in alerts/action database 122.

Video Tips

Figure 6:
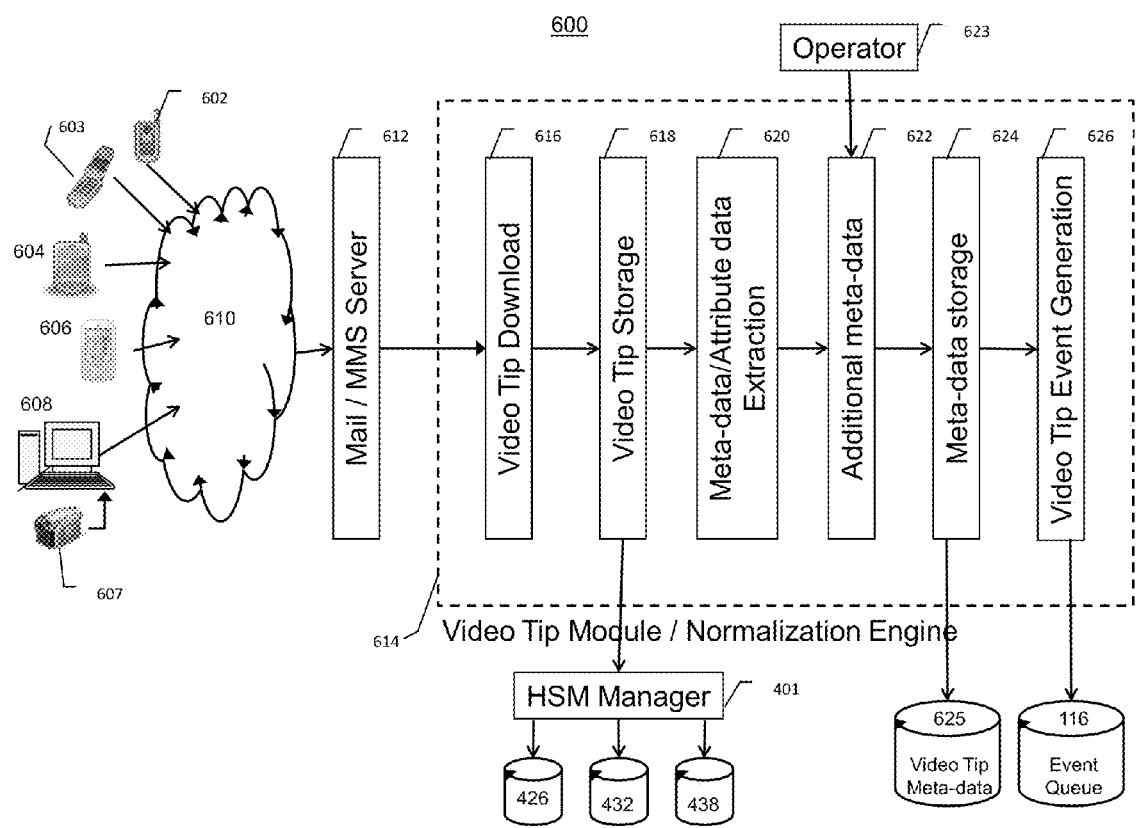
FIG. 6 illustrates an architecture of a video tip module in accordance with one embodiment of the present invention.

FIG. 6 shows an architecture 600 of one embodiment of the present invention adapted to receive "video tips" from external sources. A "video tip" is a tip which includes a video, an image, a sound recording, or any other multimedia recording, whether taken by a citizen or from some other source. In the context of the present invention, a "video tip" shall include any tip that has multimedia content, whether it is a still image, a video, audio, or any other multimedia information. In the context of the present invention, any such tip will be within the scope of the phrase "video tip." Video tips may be taken by video phones (cell phones with integrated video cameras), portable cameras, video cameras, etc. Video tips may be submitted via email directly from a cellular phone, via MMS (Multimedia Messaging Service), or first uploaded to a computer and then emailed or uploaded to a server. Increasingly vigilant citizens, as well as police officers with portable cameras, are capturing video information that could be important to solve and prevent crimes. (Before the present invention, "video tip" information is not archived, indexed, or maintained in a manner that is conducive to intelligent, pro-active alerting, or retrospective and forensic analysis.)

Video tips may be submitted from camera phones 602, 603 (phones with integrated cameras), smart phone 604 (such as Blackberry®, Windows® Mobile phones, PocketPCs, or any smart phone with integrated cameras), or multimedia phone 606 (such as Apple iPhone® or other multimedia phone). Video tips may also be captured by a portable video camera 607, a portable still camera (not shown), a portable microphone (not shown), and in general any portable recording device which may or may not be Internet-enable. The portable video camera 607 (or other portable device) may be connected to personal computer 608 (or any other Internet-enabled device), and the "video tip," including any meta-data submitted by the tipster, may be uploaded via the computer 608. The video tip may be submitted via a user interface, such as a web interface on a public (Internet) or private (Intranet) website. (For example, a person would log into the system via the Internet and upload a video of a crime that the person caught on video.)

An organization may setup a tip email address such as tips@sju.edu, and/or MMS address (Multimedia Messaging Service, an extension to SMS—Short Messaging Service, which is text-only), such as (617)455-TIPS to receive the video tips. The video tips are transmitted via the Internet 610, or any other local or global network, to mail or MMS server 612, which runs a mail server or MMS server application, which receives submitted video tips.

Video tip normalization engine 614 processes the video tips received by the mail/MMS server 612. Video tip download module 616 periodically (for example, every 30 seconds) polls the mail/MMS server 612 and downloads any newly received video tips. Video tip storage module 618 stores newly received video tips into the hierarchical file system, via HSM manager 401 which manages a set of storage pools 426, 432, 438, as was described previously. Meta-data/attribute data extraction module 620 extracts meta-data from the downloaded video tip. Examples of extracted meta-data include sender's email address (if sent via email), phone number (if sent via MMS), location (if available), IP address (if uploaded via computer 608), date and time sent, and any meta-data in the form of comments submitted by the tipster. Attribute data is also assigned to the video tip by the meta-data/attribute data extraction module 620 based on such factors as the identity of the informant, the quality of the video, the reliability of the source (e.g., whether anonymous or a registered student), other tips that are entering the system contemporaneously, etc.

After the video tip has been received and automatically processed, its content and extracted meta-data are presented to a reviewer for further analysis and comment. The reviewer may enter additional meta-data from operator interface 623 via additional meta-data module 622. The tipster's as well as the reviewer's meta-data is stored in video tip meta-data database 625 via meta-data storage module 624. Finally, a tip event is generated by the video tip event generation module 626 corresponding to the extracted meta-data and attribute data, and stored in event queue 116. The correlation engine processes the tip event from the event queue 116 as previously described in relation to FIG. 1.

Database Design

The following tables and associated description shows illustrative database schemas that may be used in an implementation of the present invention. It is to be understood that these schemas are illustrative of but one manner in which the present invention may be practiced, and the present invention is not limited to the particular database designs shown and described here.

Seven core database schemas will be shown and described. The meta-data parameters table (Table 1) describes the various primitive and compound events that are detected and recorded by the present system and their associated parameters. The meta-data types table (Table 2) defines the primitive event types that may be detected and recorded, defines the composition of compound events, and assigns absolute values (used by the correlation engine) to the meta-data types. The events table (Table 3) is an important database used by the correlation engine, and stores the actual primitive and compound events that were detected, as well as an index into the corresponding video data. The sources table (Table 4) defines the various devices (including sensory devices), and their associated attributes and weights, and is the core database used by the correlation engine, network management module, and the HSM module. The rules table (Table 5) defines the rules defining the alerts and alert conditions used by the alert/action engine. Finally, the video tip meta-data table (Table 6) and the license plate meta-data table (Table 7) stores the meta-data associated with the video tips and the detected license plates, respectively.

TABLE 1

Meta-data parameters table

| MDParametersID | Nickname | MDTypeID | SrcID | MD_TimeStart | MD_TimeEnd |
|---|---|---|---|---|---|
| 6 | Motion in Camera 1 | 1 | 1 | 17:00 | 8:00 |
| ... | ... | ... | ... | ... | ... |
| 10 | Person Enters Server Room | 23 | 4 | 0:00 | 23:59 |
| 11 | Swipe Card Detected to Server Room | 22 | 9 | 0:00 | 23:59 |
| 12 | Tailgating | 24 | 4 | 0:00 | 23:59 |
| 13 | Anonymous Video Tip | 98 | 22 | 0:00 | 23:59 |
| 14 | Registered Student Video Tip | 98 | 23 | 0:00 | 23:59 |
| 15 | Stolen Plate | 99 | 2 | 17:00 | 8:00 |
| 16 | Camera 1 loses connection | 105 | 1 | 0:00 | 23:59 |

Table 1 shows a sample meta-data parameters table, which stores the various primitive and compound events that are detected and recorded by the present system and their associated parameters. "MDParametersID" is a primary key that uniquely identifies the meta-data parameter, "Nickname" defines a short phrase that describes the event, "MDTypeID" is a foreign key into the Meta-data types table (Table 2) that defines the type of event, and "SrcID" is a foreign key into the Sources table (Table 4) corresponding to the device that detects this particular event. Finally, "MD_TimeStart" and "MD_TimeEnd" are privacy or business filters that define the times during which the particular event is active.

For example, the row "MDParametersID=6" corresponds to an event with a nickname "Motion in Camera 1." This event has "MDTypeID=1", which by examining Table 2 corresponds to a motion event. It has "SrcID=1", which by examining Table 4 corresponds to Camera 1 located in a lobby. Based on "MD_TimeStart" and "MD_TimeEnd", this event is only being monitored and recorded between the hours of 5:00 PM (17:00) and 8:00 AM (8:00) to protect privacy or to follow a business rule.

The row "MDParametersID=10" corresponds to an event with a nickname "Person Enters Server Room." This event has "MDTypeID=23", which by examining Table 2 corresponds to the detection of a person. It has "SrcID=4", which by examining Table 4 corresponds to Camera 34 located in a server room. This event is always being monitored and recorded (0:00 to 23:59).

The row "MDParametersID=11" corresponds to an event with a nickname "Swipe Card Detected to Server Room." This event has "MDTypeID=22", which by examining Table 2 corresponds to a swipe card. It has "SrcID=9", which by examining Table 4 corresponds to a swipe card reader in the server room. This event is always being monitored and recorded (0:00 to 23:59).

The row "MDParametersID=12" corresponds to an event with a nickname "Tailgating." This event has "MDTypeID=24" which by examining Table 2 corresponds to a compound event called tailgating. It has "SrcID=4" corresponding to the server room. This event is always being monitored and recorded (0:00 to 23:59).

The row "MDParametersID=13" corresponds to an event with a nickname "Anonymous Video Tip." This event has "MDTypeID=98" which by examining Table 2 corresponds to a video tip. This event has "SrcID=22" which by examining Table 4 corresponds to an anonymous source of video tips. This event is always being monitored and recorded (0:00 to 23:59).

The row "MDParametersID=14" corresponds to an event with a nickname "Registered Student Video Tip." This event has "MDTypeID=98" which also corresponds to a video tip. This event has "SrcID=23" which by examining Table 4 corresponds to a registered student being a source of video tips. This event is always being monitored and recorded (0:00 to 23:59).

The row "MDParametersID=15" corresponds to an event with a nickname "stolen plate." This event has "MDTypeID=99" corresponding to a stolen plate event type. This event has "SrcID=2" which corresponds to a camera in an entrance to a parking lot (not shown in the sources Table 4). This event is always being monitored and recorded (0:00 to 23:59).

The row "MDParametersID=16" corresponds to an event with a nickname "Camera 1 loses connection." This event has "MDTypeID=105" corresponding to a network event. This event has "SrcID=1" which corresponds to Camera 1 located in the lobby.

TABLE 2

Meta-data types table

| MDTypeID | Description | AbsVal | CompoundEvent | TimeFrame |
|---|---|---|---|---|
| 1 | Motion | 3 | null | null |
| ... | ... | ... | ... | ... |
| 22 | Swipe Card Read | −1 | null | null |
| 23 | Person Detected | 1 | null | null |
| 24 | Tailgating | 5 | 23 <AND NOT> 22 | 0:10 |
| ... | ... | ... | ... | ... |
| 98 | Video Tip | 6 | null | null |
| 99 | Stolen Plate | 50 | null | null |
| 105 | Network Event | 60 | null | null |

Table 2 shows the meta-data types table, which defines the primitive and compound event types, and their associated absolute values. "MDTypeID" is a primary key that unique identifies the type of event, and "Description" provides a short description of the event type. "AbsVal" defines the default absolute value that is associated with that particular event type. The absolute value is used by the correlation engine to assign absolute values ($x_i$ and $v_i$ in Equations 20-22 below) to various types of events, before they are weighted by the attribute data ($w_i$ in Equations 20-22 below). "CompoundEvent" defines the relationship between compound and primitive events, and "TimeFrame" defines the period of time during which two primitive events must occur into order to be eligible for detection as one compound event. "Compound Event" and "TimeFrame" are null for primitive events.

For example, row "MDTypeID=1" defines a motion event as a primitive event having an absolute value of 3. Row "MDTypeID=22" defines a swipe card read as a primitive event having an absolute value of −1. Row "MDTypeID=23"

defines a person detected as a primitive event having an absolute value of 1. Row "MDTypeID=24" defines tailgating as a compound event having an absolute value of 5. Tailgating is defined as a compound event consisting of event "23" (person detected), but not event "22" (swipe card read) during a period of 10 seconds (0:10). Note that in this example, compound events are composed of primitive events using combination logic over a period of time. However, this is not the only way to represent compound events, and alternative representations, such as the Allen relations, are also within the scope of the present invention.

Rows "MDTypeID=98" and "MDTypeID=99" define a video tip as a primitive event having an absolute value of 6, and a stolen plate event as a primitive event having an absolute value of 10.

Finally, row "MDTypeID=105" defines a network event as a primitive event having an absolute value of 60.

server room. Event "438" of "MDParameterID=14" (corresponding to a video tip received) occurred at 9:05:00 PM. Finally, event "439" of "MDParameterID=15" (corresponding to a stolen plate event) occurred at 9:14:04 PM.

This sample of detected events is illustrative of a real scenario enacted in the laboratory. Note how the two primitive events (second person detected, no corresponding swipe card detected) triggered the detection of a compound event (tailgating). Notice also how the video tip event and stolen plate event were detected. The network management module, which detected that camera 1 lost connection at 7:10:18 PM placed the network event "MDEntryID=433" into the events database.

Note that the correlation engine would compute the weighted sum of all these events and generate an alert based on the threshold value (defined below in the Rules table).

TABLE 3

Events table

| MDEntryID | MDParameter ID | MD_Event_DateTime | MD_Event_Duration | SrcID | Src_Description | Src_Locaion |
|---|---|---|---|---|---|---|
| ... | ... | ... | ... | ... | ... | ... |
| 432 | 6 | 09/27/2007 7:05:24PM | 1:05 | 1 | Camera 1 | Lobby |
| 433 | 16 | 09/27/2007 7:10:18PM | 0:01 | 1 | Camera 1 | Lobby |
| 434 | 11 | 09/27/2007 8:13:08PM | 0:01 | 9 | Card Reader in Server Room | Server Room |
| 435 | 10 | 09/27/2007 8:13:10PM | 0:02 | 4 | Camera 34 | Server Room |
| 436 | 10 | 09/27/2007 8:13:14PM | 0:02 | 4 | Camera 34 | Server Room |
| 437 | 12 | 09/27/2007 8:13:24PM | 0:06 | 4 | Camera 34 | Server Room |
| 438 | 14 | 9/27/2007 9:05:00PM | 0:26 | 23 | Registered Student | Off-campus (River St.) |
| 439 | 15 | 9/27/2007 9:14:04PM | 0:10 | 2 | Camera 2 | Parking Lot |

Table 3 shows an illustrative events table, which corresponds to item 118 in FIGS. 1, 2, 4, and 5. The vents table stores the actual primitive and compound events detected by the present invention. "MDEntryID" is a primary key that uniquely identifies the event entry, and "MDParameterID" is a foreign key into the Meta-data parameters table that defines the type of event that was detected. "MD_Event_DateTime" records the time of the detected event as recorded by the sensory device, and "MD_Event_Duration" records the duration of the event as recorded by the sensory device. Finally, "SrcID", "SrcDescription", and "SrcLocation" store information about the source that detected the event (even though this information is already indirectly provided by "MDParameterID").

For example, Table 3 shows eight illustrative events that were detected on Sep. 27, 2007. Event "432" of "MDParameterID=6" (corresponding to motion in the lobby) occurred at 7:05:24 PM, which is within the hours that the privacy filter allowed. Event "433" of "MDParameterID=16" (corresponding to a camera in the lobby losing network connection) occurred at 7:10:18 PM. Event "434" of "MDParameterID=11" (corresponding to a swipe card read) occurred at 8:13:08 PM. Event "435" of "MDParameterID=10" (corresponding to the detection of a person) occurred at 8:13:10 PM. Event "436" of "MDParameterID=10" (corresponding to the detection of a second person) occurred at 8:13:14 PM. Event "437" of "MDParameterID=12" (corresponding to the detection of a tailgating compound event) occurred at 8:13:24 PM since no corresponding swipe card was detected for 10 seconds when the second person was detected entering the Even though these events may not be related, there is a chance that they are related to one incident. The appropriate authorities would be notified, and would be given the chance to investigate the simultaneous occurrence of multiple suspicious events.

The primitive events may be either generated by sensory devices themselves, or by other devices (such as video analytics devices, the network management module, etc.) which take sensory inputs and detect primitive events in the data. Illustrative primitive events could be motion detected, gunshot detected, person detected, speed of an object, a camera loses connection, a stolen plate is detected, and similar events. The sensory devices themselves, the analytics devices, and/or analytics software running on a general purpose PC, could generate the primitive events.

In one embodiment of the present invention, a user interface is provided by which a human operator may enter event meta-data. For example, a user interface is provided for a security officer to monitor one or more cameras. The cameras automatically generate meta-data, as noted above. In addition, the human operator may add meta-data manually. For example, if the human operator observes suspicious activity going on in a particular camera, the human operator may add meta-data corresponding to suspicious activity. The human operator may select from a set of possible meta-data, as well as add "free-form" meta-data by typing into a text-entry box. For example, a human operator may transcribe speech in the video data. The transcribed speech serves as meta-data to the video data.

TABLE 4

| Sources table | | | | | |
|---|---|---|---|---|---|
| SrcID | 1 | 4 | 9 | 22 | 23 |
| Src_Description | Camera 1 | Camera 34 | Swipe Card Reader | Anonymous Video Tip | Registered Student Video Tip |
| Src_Type | IP Camera | IP Camera | Card Reader | Video Tip | Video Tip |
| Src_AW_Quality | 0.53 | 0.1 | 1 | 0.1 | 0.5 |
| Src_AW_Age | 0.54 | 0.4 | 0.75 | 0.1 | 0.9 |
| Src_AW_Maintenance | 0.15 | 0.15 | 0.75 | 0.1 | 0.9 |
| Src_AW_Reliability | 0.3 | 0.23 | 1 | 0.1 | 0.9 |
| Resolution | 1024 × 768 | 760 × 640 | — | — | — |
| Dvc_Install | 4/30/2007 | 5/3/2006 | 5/3/2007 | — | — |
| Dvc_LifeSpan | 5 | 4 | 10 | — | — |
| Dvc_LastMaint_Date | 8/3/2007 | 8/3/2007 | 8/3/2007 | — | — |
| Dvc_Location_Name | Lobby | Server Room | Server Room Entrance | — | — |
| Dvc_Location_Long | 42.734534 | 42.734539 | 42.734530 | — | — |
| Dvc_Location_Lat | −71.348438 | −71.348434 | −71.348431 | — | — |
| Dvc_Angle | 45 | 90 | — | — | — |
| Dvc_MAC_Address | 50-1A-01-46 | 40-8C-7C-A6-F2 | 25-D6-E4-17 | — | — |
| Dvc_IP_Address | 192.168.1.201 | 192.168.1.203 | 192.168.1.49 | — | — |
| Dvc_Status | 1 | 1 | 1 | — | — |
| Cam_NowImgURL | now.jpg | cgi-bin/nph-image | — | — | — |
| Cam_ImgStr_RootFolderName | cam1 | cam34 | — | VT_Anon | VT_Reg |

Table 4 shows a sample sources table defining the devices and their associated properties (including attribute data) that is used by the correlation engine, network management module, and the HSM module. The sources table is the core table that is used by numerous components of the present invention. Most importantly, the sources table stores attribute data for each sensory and other device on the network, which is used by the correlation engine when assigning weights to the data from each sensory device, by the network management module when placing devices on the physical map and when assigning importance to each device for network management events, and by the HSM module to help determine which data segments to cascade first and to which hierarchical level.

In the sources table, shown by example in Table 4, "SrcID" is a primary key used to uniquely identify each device on the network (for simplicity, only sensory devices are shown in Table 4). "SrcDescription" is a description of each device, such as "IP Camera," "Swipe Card Reader," "Data Storage Device," etc. "Src_AW_Quality", "Src_AW_Age", "Src_AW_Maintenance", and "Src_AW_Reliability" are examples of attribute data that may be stored for each source device. As describe previously, the attribute data is used, along with other information, to determine the relative importance of data from each sensory device. For example, "Src_AW_Quality" is a weight for the quality of the data from the sensory device (video data from higher resolution cameras are weighted higher), "Src_AW_Age" is a weight corresponding to the age of the sensory device (older sensory devices are weighted lower), "Src_AW_Maintenance" is a weight corresponding to the amount of time elapsed since the sensory device was last maintained (devices not maintained in a long time are weighted less), and "Src_AW_Reliability" is a weight corresponding to the reliability of the sensory device (such as the inverse of its historical false alarm rate). This attribute data is used by the correlation engine for the weights associated with data ($w_i$ in Equations 20-22 below). The attribute data shown and described here is but an illustrative example of attribute data according to the principles of the present invention. Other attribute data may be used depending on the business needs of an organization using the present invention. Other examples of attribute data are described below.

Continuing with the sources table in Table 4, "Resolution" describes the actual resolution of any surveillance cameras (left blank if not a surveillance camera). (Note the difference between "Resolution" which is an actual resolution, versus "Src_AW_Quality" which is a weight that may depend on the resolution for a surveillance camera.) "Dvc_Install" records the installation date of the device, "Dvc_Lifespan" defines the useful lifespan of the device, and "Dvc_LastMaint_Date" records the last time the device was maintained. (Note that these values are used to determine the "Src_AW_Age" and "Src_AW_Maintenance" weights.) "Dvc_Location_Name" is a short nickname for the location of the device, "Dvc_Location_Long" stores the longitude coordinate of the physical location of the device, "Dvc_Location_Lat" stores the latitude coordinate of the physical location of the device, while "Dvc_Angle" stores the angle of a surveillance camera (left blank for devices that don't have an angle). These values are used by the physical map module of the network management module to position the devices on the physical map, as well as to shown areas of coverage and areas of darkness (no coverage). "Dvc_MAC_Address" stores the MAC address of each device, "Dvc_IP_Address" stores the IP address of each device, and "Dvc_Status" is a Boolean flag that stores the network status of each device (1=Online, 0=Offline). These values are used by the network management module to monitor the status of each device on the network. Finally, "Cam_NowImgURL" (stores the URL of the current image for each surveillance camera) and "Cam_ImgStr_RootFolderName" (stores the URL of the default recording folder for each surveillance camera) are internal variables used by video recording servers used to record video data.

Different sensory devices, including different cameras, may have different attributes associated with them. Each attribute determines a weight, which could be a constant, or the weight could be a weighing function of the attribute. For example, consider a camera 1 that is not designed to detect gunshots, but which has a low-quality, integrated microphone, and so a gunshot detection component may use the audio to detect loud shots as gunshots. When a motion event is detected on such a camera, it would be assigned a high weight (for example, 0.85 or 85%). On the other hand, if a gunshot was detected on this camera by a gunshot detection component, the gunshot event would be assigned a low weight (0.05, or 5%) because the camera is known to have a low-quality microphone, and what may have been detected as a gunshot may have just been a drop of a metal object. In contrast, gunshot detector 1 may have the opposite attribute-weight profile, in that motion events from the gunshot detector may be weighted low (say, 0 or 0%) while gunshot events may be weighted high (say, 0.70 or 70%).

Camera 1 may also have an age attribute, indicating the age of the camera, and an associated weighting function that weights any data from the camera with a function that decreases with the age of the camera. The time since the last maintenance of the camera may also serve to generate a weight. This could be a step-function that is, for example, a function dropping to zero after 1 year of no maintenance on the camera. The frequency of failure may also serve to weigh any data from the camera, again using a function that weights network events lower from a camera that has a high frequency of failure. The resolution of the camera may also serve as attribute data to assign a weight to the data; data from a high-resolution camera would be assigned a higher weight than data from a lower resolution camera.

Another example of attribute data and associated weights that are tied to particular meta-data includes weights assigned to meta-data indicating the number of people in a particular area. This meta-data may be assigned a high weight (0.80) if it comes from camera 2, which may have high resolution, high frame-rate, and other qualities that make it amenable to high reliability for people counting purposes. Contrary, if the same meta-data comes from camera 3, which has low resolution, low frame-rate, or other qualities that make it unreliable when it comes to counting people, the meta-data may be assigned a low weight (0.40). In another example, a 3 Megapixel camera would be weighted higher than a VGA camera for purposes of face recognition or license plate recognition.

A system administrator may enter and customize the attribute data. A system administrator would customize the present system by entering weights that are associated with attribute data. For example, the system administrator would select the attribute data that corresponds with each camera. One example of administrator-customizable attribute data is the historical pattern of a camera being susceptible to being tampered with. A system administrator may identify a low-hanging camera that may be easily tampered with a lower reliability attribute weight, while a high-hanging camera that is difficult to tamper with a higher reliability attribute weight.

The system administrator may customize the attribute data for different image qualities. For example, the system administrator would select the weights associated with video data, and the corresponding meta-data, associated with different resolutions of cameras. That is, a higher resolution camera and its associated meta-data would be weighted higher than a lower resolution camera, and the system administrator would select the relative weights.

The system administrator may set attribute data based on the past evidence of usefulness of video data coming from each camera. For example, a camera that has been useful in the past for detecting, preventing, or prosecuting crimes would be assigned a higher weight by the system administrator using this user interface. That is, a camera located in a high-crime area may be given a higher attribute weight.

Other examples of attribute data include, but are not limited to, reliability of power to the camera; reliability of transmission and bandwidth; susceptibility to noise, interference, and overexposure; weather conditions around the camera; type of camera (day/night, IR, etc.), and so on.

TABLE 5

Rules table

| RuleID | Nickname | MDParamterID | Threshold Value | ContactID | MsgTxt |
|---|---|---|---|---|---|
| 1 | Alert 1 | 6 | null | 4 | Motion in lobby during forbidden hours |
| 2 | Tailgating SR | 12 | null | 1 | Tailgating in server room |
| 3 | Global Alert | null | 61 | 7 | Null |
| 4 | Stolen Plate | 15 | null | 2 | Stolen plate detected in parking lot |
| 5 | Camera 1 goes down | 16 | null | null | Camera 1 has lost connection! |

Table 5 shows an illustrative Rules table (such as rules table 216 of FIG. 2) which defines the alerts sent by the alerting engine. Alerts may be based on single or multiple occurrences of primitive events, single or multiple occurrences of compound events, or overall system-wide correlations. For example, an alert may be issued on a single primitive event such as motion in the lobby. An alert may also be issued on a single compound event such as tailgating into the server room. Finally, an alert may also be issued based on overall, system-wide level, such as the overall system exceeding a threshold value of 61.

In the sample Rules table shown in Table 5, "AlertID" is a primary key uniquely identifying each rule, "Nickname" provides a nickname for each rule, "MDParameterID" specifies which event (including primitive or compound events) that triggers the alert (or null if a system-wide alert), "ThresholdValue" specifies a threshold value which triggers an alert (for correlated system-wide alerts, or null if an event-based alert), "ContactID" specifies the group, or individual, that will receive the alert, or the set of actions that will be triggered by the alert, and "MsgTxt" specifies the text of the message sent on an alert. "ContactID" is a foreign key into another table (not shown) that specifies the list of recipients or the list of actions to be performed when the alert corresponding to "ContactID" is triggered.

"AlertID=1" corresponds to an alert on a primitive event having a nickname "Alert 1" that is triggered on "MDParameterID=6", which by reference to Table 1 corresponds to motion in Camera 1. "ContactID=4" specifies the individual who will receive the alert, and "MsgTxt" specifies the text of the message sent. (Note that "ThresholdValue" is null because the alert is on a primitive event, and not a system-wide alert.)

"AlertID=2" corresponds to an alert on a compound event having a nickname "Tailgating SR" that is triggered on "MDParameterID=12", which by reference to Table 1 corresponds to a compound event of tailgating in Camera 34.

"ContactID=1" specifies the group of individuals who will receive the alert, and "MsgTxt" specifies the text of the message sent. (Note that "ThresholdValue" is null because the alert is on a compound event, and not a system-wide alert.)

"AlertID=3" corresponds to an alert on a global correlation having a nickname "Global Alert" that is triggered when the overall system reaches a threshold value of 61 ("ThresholdValue=61"). The overall system threshold value is calculated by a weighted sum of all events entering the system during a given time. The system threshold may be calculated by weighing the events by their associated attribute data, as illustrated below in relation to Equations 20-22. "ContactID=7" specifies the set of actions to be taken when the threshold value exceeds 61, which could include putting the entire system into a different state. (Note that "MDParameterID=null" because this is a system-wide alert, not an alert on a particular event.)

"AlertID=4" corresponds to an alert on a primitive event having a nickname "Stolen Plate" that is triggered on "MDParameterID=15", which by reference to Table 1 corresponds to a stolen plate event from the vehicle information module. "ContactID=2" specifies the individual who will receive the alert, and "MsgTxt" specifies the text of the message sent. (Note that "ThresholdValue" is null because the alert is on a vehicle event, and not a system-wide alert.)

"AlertID=5" corresponds to an alert on a primitive event having a nickname "Camera 1 goes down" that is triggered on "MDParameterID=16", which by reference to Table 1 corresponds to Camera 1 located in the lobby losing network connection. "ContactID=4" specifies the individual who will receive the alert, and "MsgTxt" specifies the text of the message sent. (Note that "ThresholdValue" is null because the alert is on a network event, and not a system-wide alert.)

TABLE 6

Video tip meta-data table

| VideoTip_ID | 1 | ... | 47 |
|---|---|---|---|
| VT_MDEntryID | 245 | ... | 438 |
| VT_AnonStatus | TRUE | ... | FALSE |
| VT_Submit_DateTime | 6/12/2007 3:22:45 PM | ... | 9/27/2007 9:05:00PM |
| VT_Email_Addr | — | ... | joe@sju.edu |
| VT_Phone_Num | — | ... | 617-455-2233 |
| VT_Name | — | ... | Joe Stevens |
| VT_Location | Unknown | ... | Parking Lot |
| VT_Submitter_Comment | — | ... | Suspicious vehicle |
| VT_Reviewer_Comment | video too fuzzy to view | ... | Vehicle driving erratically |
| VT_IP | 192.168.1.45 | ... | 192.168.1.243 |
| VT_Filename | tip23.mp4 | ... | abc.avi |

Table 6 shows an illustrative Video tip meta-data table which stores the meta-data extracted from video tips. "VideoTip_ID" is a primary key that uniquely identifies the meta-data associated with each received video tip, while "VT_MDEntryID" is a foreign key into the events table (Table 3) which stores the "tip event" generated by the video tip module associated with the video tip. "VT_AnonStatus" is a Boolean value that indicates whether the video tip is anonymous or not, "VT_Submit_DateTime" specifies the date and time the video tip was submitted, "VT_Email_Addr" stores the email address of the source of the video tip (if known), "VT_Phone_Num" stores the phone number of the source of the video tip (if known), "VT_Name" stores the name of the source of the video tip (if known), "VT_Location" stores the location the video tip was taken (if known), "VT_Submitter_Comment" stores any comments submitted by the tipster, "VT_Reviewer_Comment" stores any comments entered by the reviewer of the video tip (such as a security analyst), "VT_IP" stores the IP address of the device used to submit the video tip (if known), and "VT_Filename" stores the filename of the video tip.

Two illustrative video tips are shown in Table 6. The first, with "VideoTip_ID=1" is an anonymous tip since "VT_AnonStatus=TRUE", while the second, with "VideoTip_ID=47" is from a registered student since "VT_Email_Addr=joe@sju.edu" is a valid email address of a registered student.

The first video tip ("VideoTip_ID=1") has "VT_MDEntryID=245" which corresponds to an entry in the events table (this video tip is not shown in Table 3). Since this is an anonymous video tip ("VT_AnonStatus=TRUE"), most of the other fields are blank or unknown. The reviewer added a comment stating that the video tip is too fuzzy to view. Note that the IP address of the computer used to submit the video tip and the filename of the video tip are recorded. Since this is an anonymous video tip, and additionally is hard to view, it is assigned a low attribute weight based on the Sources table (see "SrcID=22" in Table 4). This video tip will be largely disregarded by the correlation engine, and will be quickly cascaded to a lower storage hierarchy by the HSM module in order to free up memory on the higher speed devices. This video tip is likely to be unimportant, and may even be a spurious tip submitted by mischievous students, or even adversaries attempting to break the system. Accordingly, because the attribute data has resulted in a low weight for this video tip, the present invention is immune to attacks of this kind.

The second video tip shown ("VideoTip_ID=47") has "VT_MDEntryID=438" which corresponds to an entry in the events table (shown in Table 3). In contrast to the first video tip, the second video tip is not anonymous ("VT_AnonStatus=FALSE"), and it was submitted on Sep. 27, 2007 at 9:05:00 PM from a registered student named Joe Stevens with an email address (joe@sju.edu) and a phone number 617-455-2233. The tipster included meta-data comments stating that a suspicious vehicle was observed in the parking lot. The tipster included a short video clip of the suspicious vehicle (abc.avi). An authorized reviewer commented that a vehicle was driving erratically in the video clip. Because this tip comes from a registered student, the Sources table (see "SrcID=23" in Table 4) indicates that it will be weighted heavily by the correlation engine (which may generate an alert that an important video tip was received), and it will be stored longer on the highest hierarchy of data storage devices for forensic analysis and review.

This example illustrates meta-data and attribute data extracted from a video tip. The meta-data includes such items as the comments from the submitter, the date of submission, and the email address of the submitter. The attribute data includes such items as the anonymity status of the video tip and the associated weights extracted from the Sources table.

TABLE 7

License plate meta-data table

| LPCaptureListID | 1 | ... | 456 |
|---|---|---|---|
| LP_MDEntryID | 142 | ... | 439 |
| LP_Number | F51462 | ... | ZEE96 |
| LP_State | Florida | ... | Michigan |
| LP_ExpDate | 05/2009 | ... | 07/2010 |
| LP_StolenDate | 09/2007 | ... | — |
| VIN | — | ... | — |
| V_Make | Ford | ... | Chevrolet |
| V_Model | Taurus | ... | Jeep |

TABLE 7-continued

License plate meta-data table

| | | | |
|---|---|---|---|
| V_Year | 2006 | ... | 1999 |
| V_Color | Blue | ... | Red |
| V_Type | 4-door | ... | SUV |
| V_Owner_Name | — | ... | Lisa Smith |
| V_Reg_Date | — | ... | 01/2006 |
| V_Reg_Status | — | ... | Registered |
| DL_Num | — | ... | D5069482 |
| DL_State | — | ... | Michigan |
| DOB | — | ... | 06/12/1981 |
| SSNum | — | ... | 052-80-9203 |
| EyeColor | — | ... | Brown |
| HairColor | — | ... | Brown |
| Height | — | ... | 5'8" |
| Weight | — | ... | 140 |
| Sex | — | ... | Female |
| Race | — | ... | Caucasian |
| Warrants_Desc | — | ... | Outstanding warrant |
| Warrants_IssuedBy | — | ... | Michigan |
| QueryDate | — | ... | 09/27/2007 |

Table 7 shows an illustrative License plate meta-data table which stores the meta-data extracted about vehicles detected in the video. "LPCaptureListID" is a primary key that uniquely identifies each license plate detected and captured in the video data. "LP_MDEntryID" is a foreign key into the Meta-data store table (Table 3) which stores the "vehicle event" generated by the vehicle information module corresponding to this license plate. "LP_Number" stores the actual license plate detected, "LP_ExpDate" stores the expiration date of the license plate, "LP_StolenDate" stores the date the plate was stolen (only relevant for stolen plates, and null if not stolen), "VIN" stores the vehicle information number used by some vehicles (or null if not known or not applicable), "V_Make" stores the manufacturer of the vehicle (e.g., Ford), "V_Model" stores the model name of the vehicle (e.g., Taurus), "V_Year" store the year the vehicle was made (e.g., 2007), "V_Color" stores the color of the vehicle (e.g., red), and "V_Type" stores the type of the vehicle (e.g., 4-door).

"V_Owner_Name" stores the name of the registered owner (if known), "V_Reg_Date" stores the registration date of the vehicle (if known), and "V_Reg_Status" stores the registration status of the vehicle (registered, etc.). "DL_Num" stores the driver's license number of the registered owner (if known), "DL_State" stores the state of the driver's license of the registered owner (if known), "DOB" stores the date of birth of the registered owner (if known), "SSNum" stores the social security number of the registered owner (if known), "EyeColor" stores the eye color of the registered owner (if known), "HairColor" stores the hair color of the registered owner (if known), "Height" stores the height of the registered owner (if known), "Weight" stores the weight of the registered owner (if known), "Sex" stores the sex of the registered owner (if known), "Race" stores the race of the registered owner (if known), "Warrants_Desc" stores any warrant information about the registered owner (if known and available), "Warrants_IssuedBy" stores the jurisdiction that issued the warrants (if known and available).

If any of the information is unknown or unavailable, "NULL" is stored. All of this information is retrieved from law enforcement databases (such as state, local, FBI, Interpol databases) by the vehicle information module as described previously. The information on the vehicle is populated based on the vehicle's license plate (which may be extracted from the video automatically or entered manually by a human operator). Based on the registered owner of the vehicle, information about the registered owner (such as warrants, etc.) may be retrieved from the law enforcement database(s) by querying based on name. The present invention has been successfully connected to public FBI and Interpol databases, public State of Florida databases on stolen plates, stolen vehicles, etc., as well as private State of Michigan (CLEMIS) database(s). The present invention may be made to work with any existing state, local, or federal crime enforcement database.

Forensic Analysis

Forensic analysis and event correlation across both space and time may be performed using the database schemas described here according to the principles of the present invention. The events, both primitive and compound, that are recorded in the events table (Table 3) may be used as indices into the video data. After the events have been stored in the events table, the events may be used to significantly enhance search and retrieval of the video data. That is, in order to perform a search of the video data, the events table may be searched first, and the video data may be indexed by the events from the events table.

For example, suppose an event was recorded in the events table during detection of a person in a particular camera. If at a later time it were desired to locate all places in the video data where a person was detected, a database query would be performed on the events table to retrieve all events where people were detected. The pointers to the video data and the indices into the video data would provide a mechanism by which to retrieve the video data that corresponds to those occurrences of people.

Figure 10:
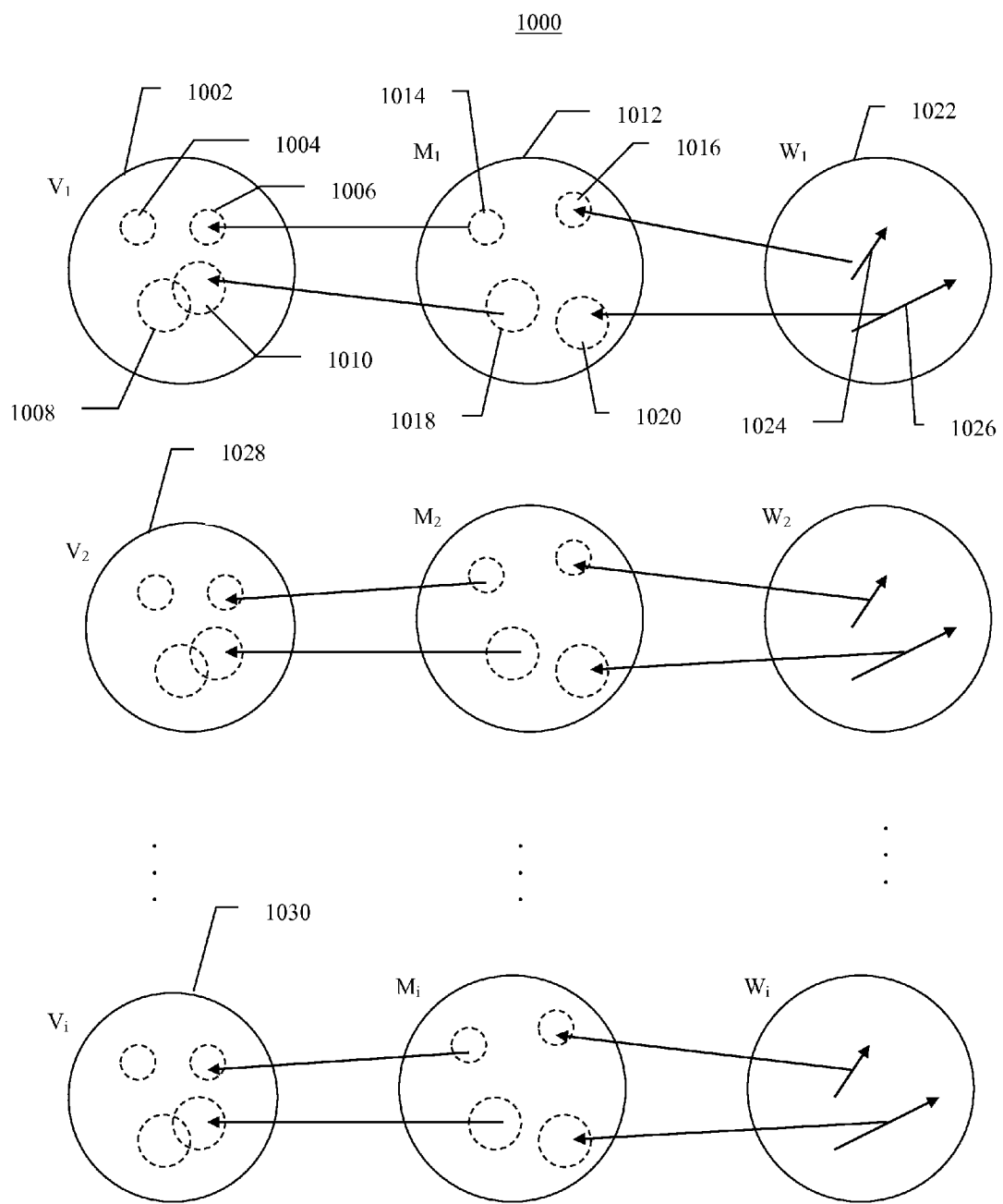
FIG. 10 illustrates a mathematical model of the present invention.

FIG. 10 shows a possible set-theoretic explanation of the operation of the above historical analysis. Consider the sets of video data $V_1, V_2, \ldots, V_i$ shown as elements 1002, 1028, and 1030 in FIG. 10 respectively. Sets $V_1$ (element 1002) and $V_2$ (element 1028) represent video data from camera 1 and camera 2, respectively, and so on. Each set of video data $V_i$ has subsets of video data, for example, subsets for a particular date range, for a particular time range, for a particular event, etc. For example, video set 1002 has subsets of video data identified as elements 1004, 1006, 1008, and 1010 in FIG. 10.

Each set of video data $V_i$ has a corresponding set of meta-data $M_i$ associated with it. Each element in the set of meta-data $M_i$ has an index, or a pointer, to a corresponding portion of the video data $V_i$. For example, meta-data set $M_1$, shown as element 1012 in FIG. 10, has corresponding subsets of meta-data, shown as elements 1014, 1016, 1018, and 1020. Each subset of meta-data is indexed, or points to, a corresponding subset of video data. For example, subset 1014 of meta-data $M_1$ is indexed, or points to, subset 1006 of video data $V_1$ from camera 1 (not shown). Note that a one-to-one relationship between video data and meta-data is illustrated in FIG. 10 for clarity. The relationship between video-data and meta-data is not restricted to being one-to-one. The relationship may be one-to-many, many-to-one, as well as many-to-many.

In addition, sets $W_i$ of attribute weight data are weight vectors associated with each set of meta-data $M_i$ for camera i (not shown). The sets $W_i$ of attribute weight data are sets of vectors $w_{i,j}$ which represent weights associated with subsets of the meta-data $M_i$. For example, weight vector $w_{i,j}$ represented as element 1024, represents the weights associated with meta-data subset 1016. The weight vectors $w_{i,j}$ may be n-dimensional vectors representing the weights in one of a number of dimensions, each dimension representing a weight in a particular attribute of the data. For example, a 2-dimensional weight $[w_{11}, w_{12}]$ vector may represent the attribute weights associated with the reliability of a particular video camera for both motion detection reliability as well as gunshot detection reliability. One camera may have high motion detection reliability and low gunshot detection reliability, while another camera may have high gunshot detection reliability and low motion detection reliability. In principle, the attribute weight vectors $w_{ij}$ may be arbitrarily fine-grained with respect to subsets of the meta-data and subsets of the video data. In practice, attribute weight vectors $w_{ij}$ are constant over large subsets of the meta-data and the video data, and may have large discontinuities between subsets. For example, gunshot detection devices may have a very low motion detection reliability weight, and very high gunshot detection reliability, and vice versa for typical motion detection cameras.

The set-theoretic described has been shown and described here for ease of understanding and explanation of the present invention. The meta-data and video data may or may not be stored as sets; the data may be stored in matrices, tables, relational databases, etc. The set description is shown for clarity only. The present invention is not limited to this particular mathematical representation, and one of ordinary skill will recognize numerous alternative and equivalent mathematical representations of the present invention.

A possible query to retrieve those events in which a person was detected would be:

SELECT*FROM EVENTS WHERE MDParameterID=10    (1)

Query (1) would retrieve all events where a person was detected. In the set-theoretic notation described above, the query (1) would correspond to:

$$\forall x_j \in V_i | M_{i,j}(\text{MDParameterID}=10) \quad (2)$$

In order to view the video data corresponding to a particular event, a possible follow-on query would be:

VIEW EVENT 1    (3)

Similar queries could be used to retrieve other events. For example, in order to retrieve all tailgating events, a possible query would be:

SELECT*FORM EVENTS WHERE MDParameterID=12    (4)

Query (4) would be represented in set-theoretic notation as:

$$\forall x_j \in V_i | M_{i,j}(\text{MDParameterID}=12) \quad (5)$$

To view the first 3 events where tailgating was detected, a possible query would be:

VIEW EVENT 1, 2, 3    (6)

Another possible query, to search for all video data where a swipe card was detected, a possible query would be:

SELECT*FROM EVENTS WHERE MDParameterID=11    (7)

Query (7) would be represented in set-theoretic notation as:

$$\forall x_j \in V_i | M_{i,j}(\text{MDParameterID}=11) \quad (8)$$

Similarly, in order to view the video data corresponding to the first two events where a swipe card was detected, a possible query would be:

VIEW EVENT 1, 2    (9)

Event searches may be restricted by particular locations or date-ranges. For example, a security analyst may only wish to search a particular camera, or location, where motion was detected, for example:

SELECT*FROM EVENTS WHERE MDParameterID=6 AND SrcID=1    (10)

Query (10) would be represented in set-theoretic notation by restricting the search to $V_1$ (video data from camera 1) as follows:

$$\forall x_j \in V_1 | M_{1,j}(\text{MDParameterID}=6) \quad (11)$$

The security analyst may also restrict searches by date and/or time. For example, the security analyst may only wish to search a particular date range where motion was detected, for example:

SELECT*FROM EVENTS WHERE MDParameterID=6 AND

MD_Event_DateTime>=09/26/2007    (12)

Query (12) may be represented in set-theoretic notation as:

$$\forall x_j \in V_i | \{M_{i,j}(\text{MDParameterID}=6) \cap M_{i,j}(\text{MD\_Event\_DateTime}>=09/26/2007)\} \quad (13)$$

Multiple events may also be searched. For example, a security analyst may want to search historical video data for all occurrences where a network event was detected or people were detected. A possible query to accomplish this would be:

SELECT*FROM EVENTS WHERE MDParameterID=10 OR MDParameterID=16    (14)

Query (14) may be represented in set theoretic notation as:

$$\forall x_j \in V_i | \{M_{i,j}(\text{MDParameterID}=10) \cup M_{i,j}(\text{MDParameterID}=16)\} \quad (15)$$

Any number of combinations and sub-combinations of events may be searched using the query language, including unions and intersections (conjunctions and disjunctions) of events using AND/OR operators, as well as other logical operators.

Events may also be correlated and analyzed across multiple cameras, or multiple locations. For example, a security analyst may want to see all events where motion was detected in a particular lobby, or a stolen plate was detected in a parking lot camera. To perform such a search, the security analyst could search by:

SELECT*FROM EVENTS WHERE (MDParameterID=6 AND SrcID=1) OR (MDParameterID=15 AND SrcID=2)    (16)

Query (16) may be interpreted in set-theoretic notation as:

$$\forall x_j \in V_1 \cup V_3 | \{M_{i,j}(\text{MDParameterID}=6) \cap M_{2,j}(\text{MDParameterID}=15)\} \quad (17)$$

The security analyst is not required to using a query language. A query language may be used for sophisticated searches. For more basic searches, a user interface is provided for the security analyst, which allows the officer to select the meta-data criteria by which to search by using a visual tool. The user interface automatically generates the query language and queries the events database for retrieval.

A possible structured query language was shown here. However, the present invention is not limited to the query language shown or described here. Any number of query languages are within the scope of the present invention, including SQL, IBM BS12, HQL, EJB-QL, Datalog, etc. The query languages described here is not meant to be an exhaustive list, and are listed here for illustrative purposes only.

When performing queries on meta-data, such as unions and intersections, attribute weights may be recalculated. For example, to recalculate the attribute weights for an intersection of two subsets of meta-data, the attribute weights would be multiplied together, as shown:

$$W(M_1 \cap M_2) = W(M_1) \cdot W(M_2), \quad (18)$$

For example, to calculate the weight associated with two motion events occurring substantially simultaneously, where the first motion event has a reliability of 90% (0.90), and the second motion event has a probability of 50% (0.50), the weight associated with both motion events substantially simultaneously is 45% (0.45).

To recalculate the attribute weights for a union of two subsets of meta-data, the law of addition of probabilities would be applied, as shown:

$$W(M_1 \cup M_2) = W(M_1) + W(M_2) - W(M_1) \cdot W(M_2) \quad (19)$$

For example, to calculate the weight associated with either one of two motion events occurring substantially simultaneously, where the first motion event has a reliability of 90% (0.90), and the second motion event has a probability of 50% (0.50), the weight associated with either one of the events occurring substantially simultaneously is 95% (0.95).

Event Correlation

One embodiment of the present invention allows real-time alerts to be issued based on the present and historical video data, and especially the present and historical meta-data (events). In one embodiment of the present invention, the correlation engine correlates events, both present and historical, across multiple sensory devices and multiple locations, and activates via the alert/action engine one or more actions in response to the correlation exceeding a particular threshold. As previously described, the correlation engine may evaluate various rules, such as "issue an alert to a given destination when a person is detected in a restricted area during a designated time." Video analytics devices are used to extract relevant events from the video data, and are input into the correlation engine. Input may also come from other systems, such as other sensory devices (e.g., temperature and pressure probes). Various actions may be taken under certain conditions, and may be activated by the alert/action engine when a certain set of conditions are met.

In addition to alerting on the occurrence of primitive or compound events, the present invention may also alert based on an accumulated value of multiple events across space and time. Equations 20 to 22 show possible rules that may be evaluated by the correlation engine. For example, as shown in Eq. 20, action component $a_l$ will be activated if the expression on the left-hand side is greater than a predetermined threshold $\tau_1$. In Eqs. 20-22, "a" stands for an action, "w" stands for attribute weights, "x" stands for non-video events, and "v" stands for video events. Eqs. 20-22 could represent a hierarchy of actions that would be activated for different threshold scenarios. Eqs. 20-22 are illustrative of only one embodiment of the present invention, and the present invention may be implemented using other equations, other expressions.

$$a_1: \sum_{i=1}^{i=N} w_i \cdot x_i + \sum_{i=1}^{m} w_i \cdot v_i \geq \tau_1 \quad (20)$$

$$a_2: \sum_{i=1}^{i=N} w_i \cdot x_i + \sum_{i=1}^{m} w_i \cdot v_i \geq \tau_2 \quad (21)$$

...

$$a_n: \sum_{i=1}^{i=N} w_i \cdot x_i + \sum_{i=1}^{m} w_i \cdot v_i \geq \tau_n \quad (22)$$

Equation 23 shows an example of a calculation for determining weights. The weights "$w_i$" may be a weighted average of attribute data (a), including resolution of the video data (R, "Src_AW_Quality" in Table 4), age of the camera used to capture the video data (A, "Src_AW_Age" in Table 4), time since last maintenance of the camera used to capture the video data (TM, "Src_AW_Maintenance" in Table 4), and reliability of the source of the video data (RS, "Src_AW_Reliability" in Table 4). Note that a similar expression was used to calculate the importance (Y) of data by the HSM module when determining when to cascade data. Other weighting factors may also be used, and the weighing factors described here are illustrative only and are not intended to limit the scope of the invention.

$$w_i = \sum_{k=1}^{N} \omega_k a_k \quad (23)$$

In equation 23, $\omega_k$ are relative weights of the attributes ($a_k$), which are themselves weights associated with the data sources. The preceding equations are illustrative of but one manner in which the present invention may be implemented and are not intended to limit the scope to only these expression(s).

Alternative Embodiments

In one embodiment of the present invention, several user interfaces may be provided. For example, a user interface may be provided for an administrator, who can modify various system parameters, such as the primitive events being detected and recorded, the compound events and their definition in terms of primitive events, the attribute data, the rules, the thresholds, as well as the action components, alert destinations, contact lists, and group lists. Another user interface may be provided for an officer, such as a security guard, to monitor the activity of the system. For example, a user interface for the security officer would allow the officer to monitor alerts system-wide, turn on and off appropriate cameras, and notify authorities. An interface may also be provided for an end-user, such as an executive. The interface for the end-user allows, for example, the end-user to monitor those alerts relevant to him or her, as well as to view those cameras and video sources he or she has permission to view. Various user interfaces may be created for various users of the present invention, and the present invention is not limited to any particular user interface shown or described here. Other user interface screens, for adding meta-data and for modifying attribute data, were discussed above.

Figure 11:
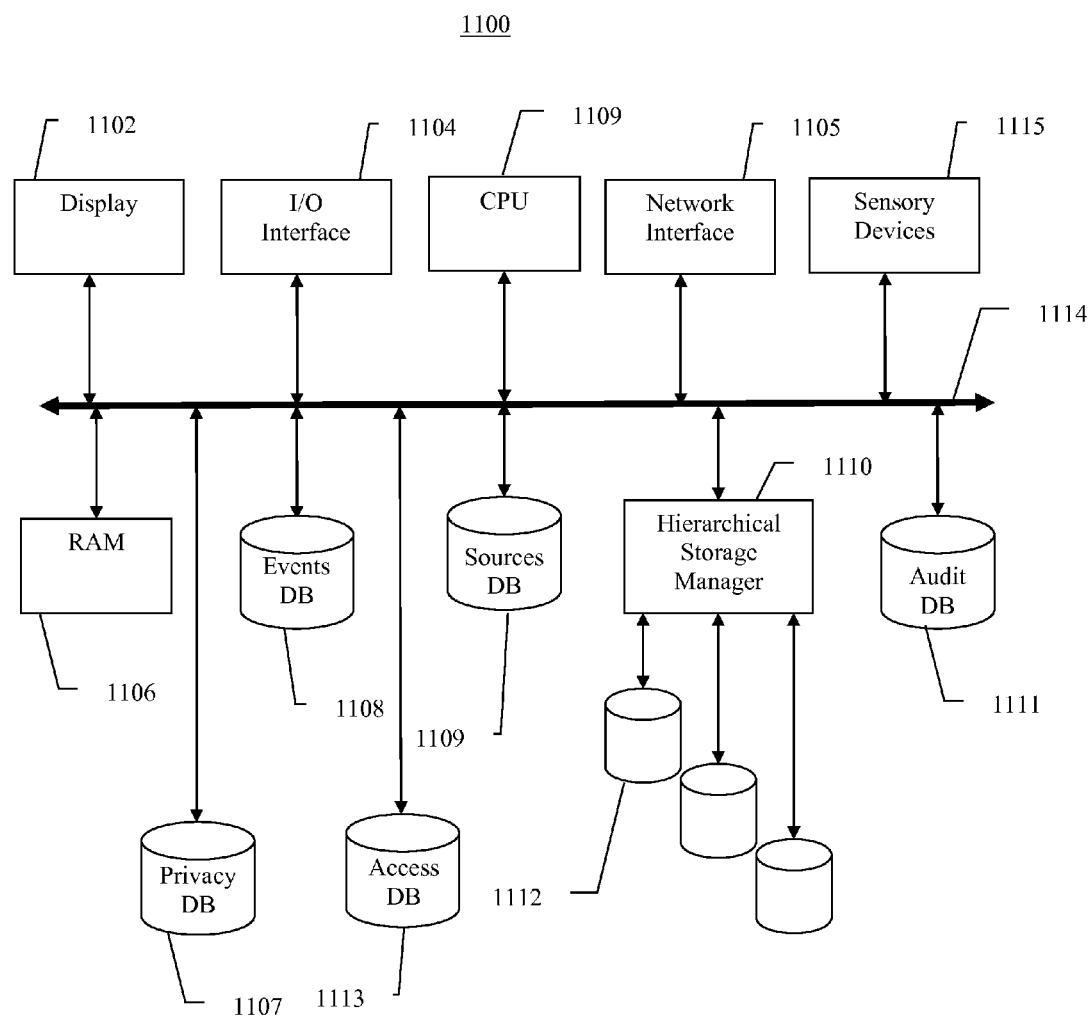
FIG. 11 illustrates a system architecture of another embodiment of the present invention.

FIG. 11 shows an example of a hardware architecture 1100 of one embodiment of the present invention. The present invention may be implemented using any hardware architecture, of which FIG. 11 is illustrative. A bus 1114 connects the various hardware subsystems. A display 1102 is used to present the operator interface 123 of FIG. 1. An I/O interface 1104 provides an interface to input devices, such as keyboard and mouse (not shown). A network interface 1105 provides connectivity to a network, such as an Ethernet network, a Local Area Network (LAN), a Wide Area Network (WAN), an IP network, the Internet, etc. (not shown in FIG. 11). Various sensory devices 1115 may be connected to the bus 1114. RAM 1106 provides working memory while executing process 1300 of FIG. 13. Program code for execution of process 1300 of FIG. 13 may be stored on a hard disk, a removable storage media, a network location, or other location (not shown). CPU 1109 executes program code in RAM 1106, and controls the other system components. Privacy rules are stored in privacy database 1107. Meta-data is stored in events database 1108, and attribute data is stored in sources database 1109. Hierarchical storage manager 1110 provides an interface to one or more storage modules 1112 on which video data is stored. Audit information, including data about who, when, and how often someone accessed particular video data is stored in audit database 1111. As stated previously, the separation between event storage, attribute data storage, and video storage is logical only, and all three storage modules, or areas, may be implemented on one physical media, as well as on multiple physical media.

Access database 1113 stores access rights and privileges. Access to view the video data is only given to those authorized individuals who are listed in the access database 1113. Access may be restricted based on the video data, or its associated meta-data. For example, any security officer may be able to view the video data taken at night, but only security officers assigned to investigate a particular case may be given access to the video data where a gunshot was detected.

Access may also be restricted by attribute data. For example, only certain high-level security officers may have access to high quality video data from behind a bank teller that may show checks and amounts, whereas any security officer may see the video data from the bank's lobby. Access may also be modulated based on the quality of the video data. For example, anybody may be able to login and view a VGA resolution view of the lobby of their building, but only the security officer can see the mega-pixel resolution video. The access control may be implemented using an authentication scheme provided by the operating system, such as Microsoft ActiveDirectory™ or LDAP under Linux.

It is to be understood that this is only an illustrative hardware architecture on which the present invention may be implemented, and the present invention is not limited to the particular hardware shown or described here. It is also understood that numerous hardware components have been omitted for clarity, and that various hardware components may be added without departing from the spirit and scope of the present invention.

Figure 12:
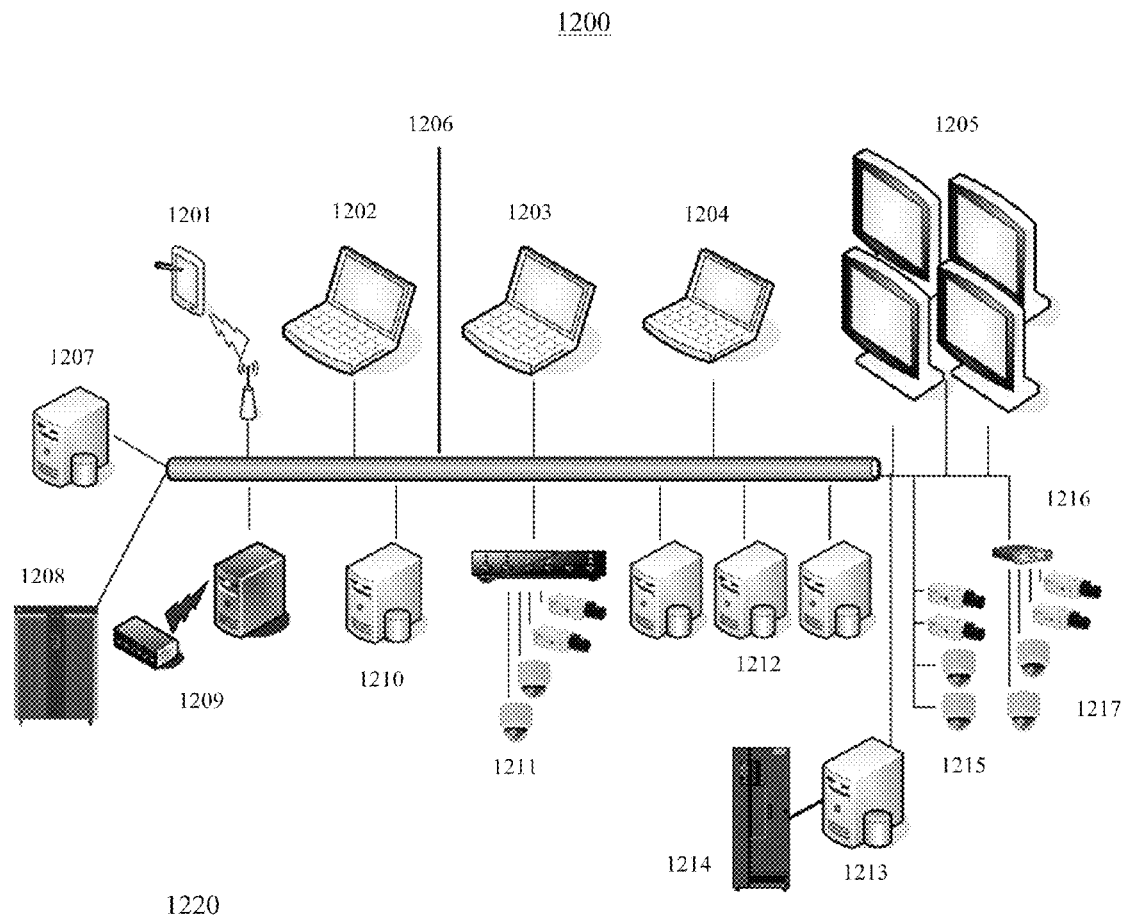
FIG. 12 illustrates yet another system architecture of yet another embodiment of the present invention.

FIG. 12 shows another example of a hardware architecture 1200 according to another embodiment of the present invention. A network 1220, such as an IP network over Ethernet, interconnects all system components. Digital IP cameras 1215, running integrated servers that serve the video from an IP address, may be attached directly to the network. Analogue cameras 1217 may also be attached to the network via analogue encoders 1216 that encode the analogue signal and serve the video from an IP address. In addition, cameras may be attached to the network via DVRs (Digital Video Recorders) or NVRs (Network Video Recorders), identified as element 1211. The video data is recorded and stored on data storage server 1208. Data storage server 1208 may be used to store the video data, the meta-data, as well as the attribute data and associated weights. Data is also archived by data archive server 1213 running the Hierarchical Storage Module on enterprise tape library 1214. Data may also be duplicated on remote storage 1206 via a dedicated transmission media such as a fiber optic line, or via a public network such as the Internet.

Legacy systems, such as external security systems 1209, may be interfaced via appropriate normalization engine, as described previously. A central management server 1210 manages the system 1200, provides system administrator, access control, and management functionality. Enterprise master and slave servers 1212 provide additional common system functionality. Video analytics server 1207 provides the video analytics device functionality described above, as well as providing the interface to search, retrieve, and analyze the video data by event stored on data server 1208.

The video, including live feeds, as well as recorded video, may be viewed on smart display matrix 1205. The display matrix includes one or more monitors, each monitor capable of displaying multiple cameras or video views simultaneously. One or more clients are provided to view live video data, as well as to analyze historical video data. Supported clients include PDA 1201 (such as an Apple iPhone®), central client 1202, and smart client 1203. A remote client 1204 may be connected remotely from anywhere on the network or even over the public Internet, due to the open IP backbone of the present invention. FIG. 12 is illustrative of but one hardware architecture compatible with the principles of the present invention, and is not intended to limit the scope of the present invention.

Figure 13A:
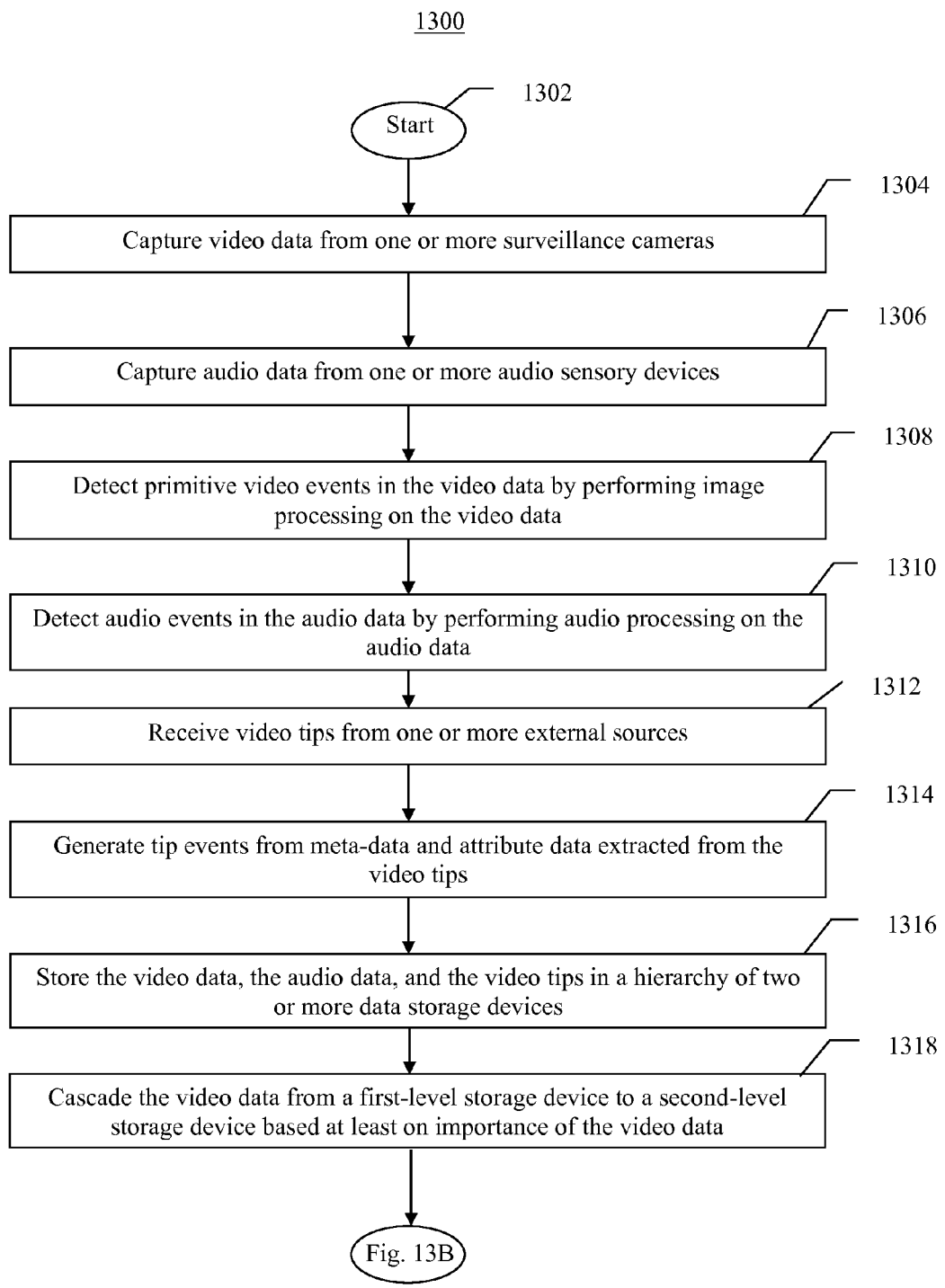
FIG. 13 illustrates a flowchart of a process for video surveillance, storage, and alerting according to one embodiment of the present invention.
Figure 13B:
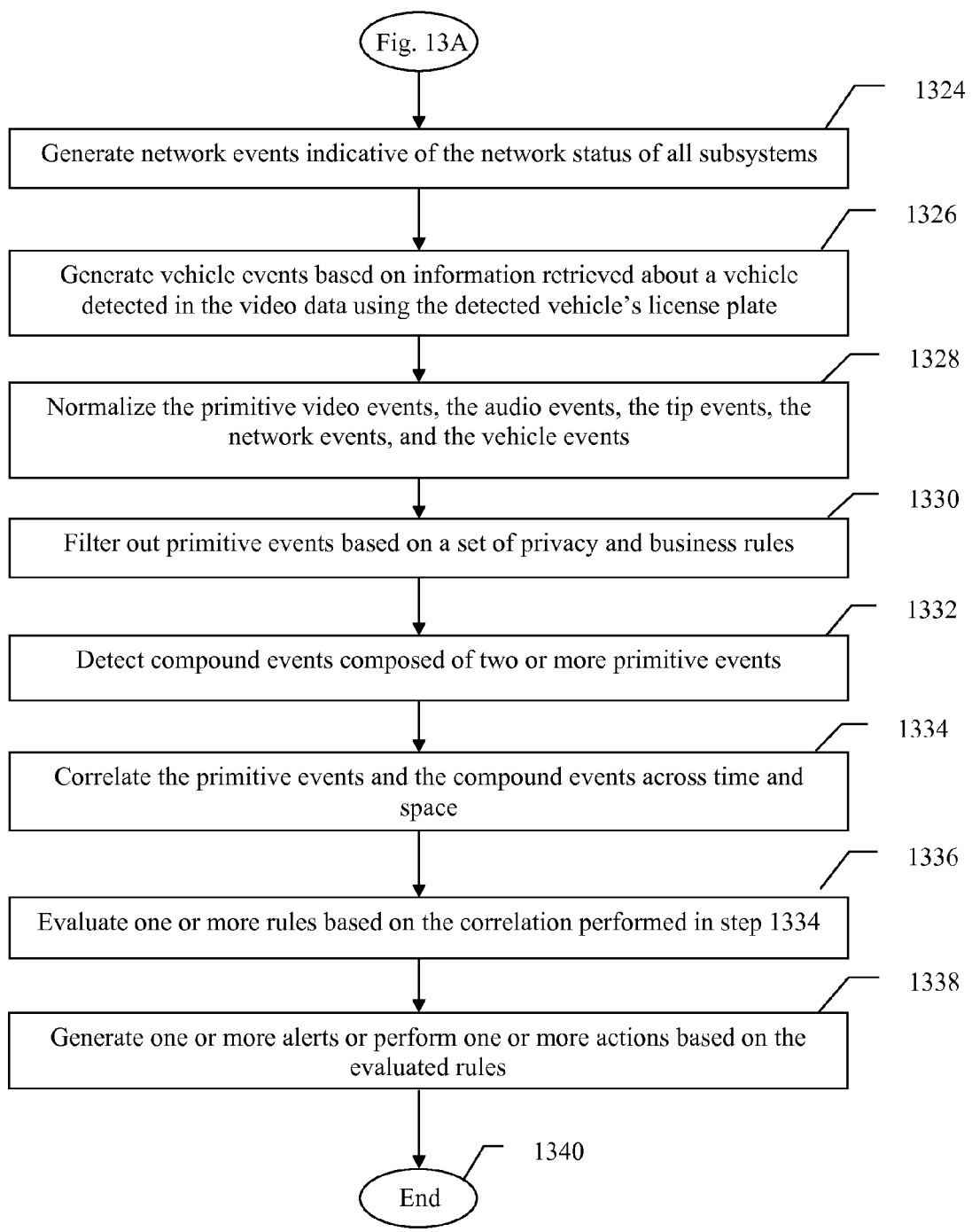

FIG. 13 (consisting of FIGS. 13A and 13B) shows a flowchart of a process 1300 of a method of video surveillance, storage, and alerting. The process 1300 begins in step 1302, as shown in FIG. 13A. Video data is captured from one or more surveillance cameras having attribute data (the attribute data represents the importance of the surveillance cameras), as shown in step 1304. Audio data is captured from one or more audio sensory devices having attribute data (the attribute data represents importance of the audio sensory devices), as shown in step 1306. Primitive video events are detected in the video data by performing image processing on the video data, as shown in step 1308. Audio events are detected in the audio data by performing audio processing on the audio data as shown in step 1310. Video tips are received from one or more external sources as shown in step 1312. Tip events are generated from meta-data and attribute data extracted from the video tips (the attribute data represents the importance of the video tips), as shown in step 1314. The video data, the audio data, and the video tips are stored in a hierarchy of two or more data storage devices, as shown in step 1316. The video data, the audio data, and the video tips are cascaded from a first-level storage device to a second-level storage device based at least on importance of data, as shown in step 1318. (The first-tier device has a higher data access performance and a lower storage capacity than the second-tier device. The importance of the data is based on attribute data corresponding to the source of the video data, the audio data, and the video tips, primitive events detected in the data, time period the data was recorded, and time since the data was last accessed.) Process 1300 continues on FIG. 13B.

Network events indicative of the network status of all subsystems are generated, as shown in step 1324 in FIG. 13B. Vehicle events are generated based on information retrieved about a vehicle detected in the video data using the detected vehicle's license plate, as shown in step 1326. Vehicle events are generated by recognizing a license plate on the detected vehicle, and generating license plate events containing the detected license plate. Information is retrieved about the detected vehicle from a law enforcement database based on the recognized license plate. Finally, warrant events corresponding to warrant information for a registered owner of the detected vehicle, wanted person events corresponding to wanted person information for the registered owner of the detected vehicle, and stolen plate events if the license plate corresponds to a stolen plate are generated. (For ease of presentation, these steps are not shown in FIG. 13B.)

In step 1328, the primitive video events, the audio events, the tip events, the network events, and the vehicle events (license plate events, warrant events, wanted person events, and stolen plate events) are normalized. Primitive events are filtered based on a set of privacy rules and business rules, as shown in step 1330. (The set of privacy rules and the set of business rules may be merged into one set of rules.) Compound events, composed of two or more primitive events, are detected, as shown in step 1332. [The primitive events include one or more primitive video events, audio events, tip events, network events, vehicle events (license plate events, warrant events, wanted person events, and stolen plate events).]

In step 1334, two or more primitive or compound events are correlated across both time and space. The primitive events include one or more primitive video events from the video analytics devices weighted by the attribute data of the surveillance cameras used to capture the video data, audio events from the audio analytics devices weighted by the attribute data of the audio devices used to capture the audio data, tip events from the video tip module weighted by the extracted attribute data of the video tips, network events from the network management module weighted by attribute data of device corresponding to the network event, and vehicle events from the vehicle information module weighted by the information retrieved about the vehicle. The compound events include one or more compound events detected in step 1332 composed of two or more primitive events. (Examples of compound events include tailgating, number of people in a designated area, etc. Many examples are described below.)

In step 1336, one or more rules are evaluated based on the correlation performed in step 1334. One or more new rules may be generated based on the correlated events (not shown in FIG. 13B). Finally, one or more actions (such as alerts to designated individuals) are activated based on the evaluated rules from step 1336. (Examples of actions include rebooting a camera following a camera freeze, turning on the lights, etc. More examples are described below.)

Primitive Video Events

According to the present invention, various video analytics devices may be used to generate meta-data, or detect primitive video events, from the video data. These video analytics devices may be configured to detect any number of primitive video events. Some illustrative primitive video events are listed below. However, the present invention is not limited to these primitive video events, and various video analytics devices may be used to determine one or more primitive video events, and are all within the scope of the present invention.
1. Presence of intruder in restricted area during restricted time (excludes false alarms due to pets, wind blowing, trees moving, etc.)
2. Person or vehicle enters a designated area during a designated time
3. Person or vehicle leaves a designated area during a designated time
4. Object left in a restricted area during a designated time
5. Object taken from a designated area during a designated time
6. Vehicle in a restricted area during a restricted time
7. Vehicle driving the wrong way in a designated lane during a designated time
8. Person or vehicle loitering in a designated area during a designated time
9. Speed of motion of an object
10. Size of object
11. Area of motion of object
12. Acceleration of object
13. A face detected
14. Type of vehicle detected (SUV, car, convertible, etc.)
15. License plate of a vehicle
16. Speed of a vehicle Audio Events The following are illustrative audio events that may be detected by audio analytics devices:
1. Gunshot
2. Voice level or sound volume
3. Certain sound patterns, such as shouts or glass breaking
4. Certain key words Compound Events Some examples of compound events that may be detected using combinations and sequences of the primitive events include:
1. Number of people in designated area
2. Detect if more people entered a designated area than left the designate area
3. Detect if a person is too short in designated area
4. Detect if a person is too long in designated area
5. Number of vehicles in a designated area
6. Percent of lane occupied
7. Presence of a masked man (person detected but no face detected)
8. Vehicle loitering in a designated area followed by an intruder in a restricted area during a restricted time
9. Multiple people loitering in different restricted locations during restricted times
10. Intruder enters a restricted area during restricted time followed by a network disturbance (e.g., camera loses connection to the network)
11. Tailgating (unauthorized people following authorized people into a designated area)
12. Possible physical attack on an individual in a secure area (two people becoming one person)
13. Intruder hides himself in a secure area for future damage (person enters facility but no person leaves facility)
14. In two different locations, tailgating, physical attack, or intruder hiding in secure area
15. Count number of cleaning people or authorized personnel entering a building during a certain time, and identify any night that number of people entering goes up by more than a predetermined percentage
16. Security person does not show up in a certain period of time as required
17. No person is in designated area when a person is required
18. Certain lock is left off door and it is after a certain time, and no one is in predetermined area (no object left behind in predetermined area)
19. Certain lock is left off multiple gates monitored by multiple cameras Other Sensory Devices Additionally, various sensory devices may be integrated into system 100 of FIG. 1 by adding a normalization engine for receiving and processing the input from the sensory device. Some illustrative sensory devices are listed below. However, the present invention is not limited to these sensory devices, and various other sensory devices are within the scope of the present invention.
1. Temperature probe
2. Pressure probe
3. Altitude meter
4. Speedometer
5. Revolutions per minute meter
6. Blood pressure meter
7. Heart rate meter
8. Chlorine meter
9. Radon meter
10. Dust particle meter
11. Pollution meter
12. $CO_2$ meter 13. Bacteria meter
14. Water meter
15. Electrical meter Legacy Systems Interfaces to the following legacy systems or external systems may be provided by adding an appropriate normalization engine to the system 100 of FIG. 1.
1. Card access (access control systems)
2. Personnel systems (retrieve experience levels of personnel based on recognized face or RFID badge)
3. Inventory systems
4. Financial systems
5. Police dispatch systems
6. Currency system
7. FBI Most Wanted
8. Interpol Wanted Fugitives
9. State and Local Law Enforcement Databases—Warrants, Stolen Vehicles, Stolen Plates, Mug shots
10. Light systems
11. Access control systems (door locking/unlocking)

Alerts/Actions

As described above, various actions may be performed in response to a rule being activated. The alert/action engine may activate one or more actions under certain conditions defined by the rules. Some illustrative actions are listed below. However, the present invention is not limited to these particular actions, and other actions are within the scope of the present invention.
1. Send email to designated person
2. Send media-rich alert to Apple iPhone® or other multimedia hand-held device
3. Send SMS to designated phone number
4. Connect voice to designated person (IT director, maintenance person, security)
5. Notify authorities/police/fire
6. Reboot camera upon failure
7. Send alert to public address system
8. Send message or picture to police
9. Send text message (SMS) to mass list (e.g., all students on a campus)
10. Call designated phone
11. Turn lights on or off in a designated area
12. Turn thermostat up or down
13. Turn camera on or off
14. Issue a forced alert (with automatic escalation if no response)
15. Follow a person using Pan-Zoom-Tilt (PTZ) camera
16. Follow a person from camera to camera
17. Activate electronic locks Service Components According to one embodiment of the present invention, service components may be used to integrate human intelligence into the present invention. For example, a service component may provide a user interface for remote security guards who may monitor the video inputs. Some illustrative examples of what the security guards could monitor for and detect is listed below. A human operator may detect some events, such as "suspicious behavior," which may be difficult for a computer to detect. The human operators may also add meta-data for each occurrence of an event. For example, a security guard may add meta-data to each portion of a video where he or she noticed suspicious activity. The present invention is not limited to the examples described here, and is intended to cover all such service components that may be added to detect various events using a human operator.
1. Detect people going into building but not coming out
2. Detect people carrying packages in and not carrying out
3. Detect people carrying packages out but not carrying in
4. Detect people wearing different clothes
5. Detect people acting suspiciously
6. Detect people carrying guns
7. Detect people tampering with locks
8. Detect people being mugged
9. Detect a shooting
10. Detect people being bullied The present invention may be implemented using any number of primitive and compound events, sensory devices, legacy systems, actions, and service components. Some illustrative components are presented here, but the present invention is not limited to this list of components. An advantage of the present invention is the open architecture, in which new components may be added as they are developed.

The components listed above may be reused and combined to create advanced applications. Using various combinations and sub-combinations of components, it is possible to assemble many advanced applications.

Real-World Scenarios

The following discussion illustrates just a small selection of advanced applications that may be created using the above components, and describes the occurrences of real shootings that may have been prevented and the assailants apprehended if the present invention was in use.

Consider a scenario corresponding to Virginia Tech, in which 32 people were killed and 24 others were injured. First, a card access is detected at a secured dormitory entrance while two people walk through the entrance. These two events are compounded and recognized as a tailgating event. No alert is issued because the system is in Low-Alert State (the threshold for an alert has not been exceeded). Next, a gunshot is either detected by a gunshot detector, or a gunshot is reported on campus by a student (tip). This report puts the system goes into a High Alert State (the absolute value of a gunshot event is high in the Meta-data types table). This event automatically triggers a warning email to the entire campus community.

Following this event, a card access at a secured dormitory entrance is detected again, while two people walk through the entrance. These two events are compounded and recognized as a tailgating event. An alert is automatically issued to an operator based on the tailgating compound event because the system is in High Alert State. The operator's attention is drawn to the particular camera that corresponds to the tailgating alert, and he or she instantly looks at the tailgating video and sees that the tailgater is carrying a suspicious object (e.g., could be a gun). The operator immediately triggers an alert email/SMS message to residents of that dormitory to stay inside their rooms and lock their doors. Thus, the operation of the present system at Virginia Tech could have saved lives. The killer walked around campus for two hours, and tailgated into a secure facility over 2 hours after the first gunshots were reported.

Consider another scenario corresponding to a stalker. On day 1, a car loiters outside a dormitory for an hour. The loitering event is detected, stored, and indexed, but no alert is generated. On day 2, the car again loiters outside the dormitory for an hour. The loitering event is detected, stored, and indexed, but no alert is generated. A woman in the building reports that she is being stalked. The security guard queries for multiple instances of loitering cars over the past two days. The security guard identifies the vehicle of the stalker (and writes down license plate number), and confirms the stalker's identity with the woman. The security guard runs the license plate through law enforcement databases as previously described and checks for outstanding warrants, which come back as negative. The security guard then creates a new rule to generate an alert when vehicles loiter outside that particular building. On day 3, the car again loiters outside the dormitory. An alert is generated by the system based on the new rule and sent to the security guard. The security guard positively identifies the car as the same car as in the previous occasions. Finally, the security guard dispatches the police to stop the vehicle and inquire into the driver. A possible rape, stalking incident, violence, or altercation may have been prevented.

Consider another a scenario at a construction site. A truck drives up to a construction site at 2 AM. The video and corresponding event is stored because a rule was previously defined to detect vehicles in restricted areas during certain hours, but no alert is generated (since it could be a patrol officer). Five minutes later, the network management module detects that a camera monitoring the construction site has lost connection, and generates a network management event. The correlation engine correlates the two events (vehicle in restricted area) and a camera in the same location losing connection, and an alert is generated to a security guard showing the two anomalous events (the truck in the restricted area and the camera failure) on a map. The security guard is given an option to either monitor other cameras in the area in real-time, dispatch an officer to the site, and/or raise the alert level in the area of the construction site, so that other events which normally would not have triggered an alert now would.

Several examples of illustrative scenarios in which the present invention could be applied were described here. However, as will be immediately recognized by one of ordinary skill, the present invention is not limited to these particular scenarios. The present invention could be used to help prevent and fight crime as well as ensure safety procedures are followed.

In one embodiment, a system administrator may set the rules. The system administrator may hold an ordered, procedural workshop with the users and key people of the organization using the present invention to determine which primitive events to detect, which compound events to detect, what weighing criteria (attribute data) to assign to devices, and what alerting thresholds to use, as well as who should receive which alerts.

In another embodiment, the rules may be heuristically updated. For example, the rules may be learned based on past occurrences. In one embodiment, a learning component may be added which can recognize missing rules. If an alert was not issued when it should have been, an administrator of the system may note this, and a new rule may be automatically generated. For example, if too many alerts were being generated for motion in the parking lot, the weights associated with the time would be adjusted.

More Alternative Embodiments

Various embodiments of the present include a method, a system, and an apparatus of video surveillance having network management, hierarchical data storage, a video tip module, and a vehicle information module.

One embodiment of the present invention is a video surveillance, storage, and alerting system ("the system"), including the following components. One or more surveillance cameras for capturing video data having attribute data (the attribute data represents importance of the surveillance cameras). One or more video analytics devices, adapted to process the video data from one or more of the surveillance cameras and to detect primitive video events in the video data. One or more audio sensory devices for capturing audio data having attribute data (the attribute data represents importance of the audio sensory devices). One or more audio analytics devices adapted to process the audio data from one or more of the audio sensory devices and to detect audio events in the audio data. A video tip module for receiving video tips from one or more external sources, adapted to extract meta-data and attribute data from the video tips and to generate tip events based on the extracted meta-data and attribute data, the attribute data representing the importance of the video tips. (A "video tip" is a tip consisting of a video clip, an audio clip, a still image, or other multimedia information which can be submitted from a cell phone, or any portable camera.) A hierarchy of two or more data storage devices for storing the video data from the surveillance cameras, the audio data from the audio sensory devices, and the video tips from the video tip module. (The hierarchy of data storage devices is connected to the surveillance cameras, the audio sensory devices, and the video tip module via a network.) A hierarchical storage manager for managing storage and cascade of the video data, the audio data, and the video tips in the hierarchy of data storage devices based on the corresponding attribute data. A network management module for monitoring network status of the surveillance cameras, the audio sensory devices, and the data storage devices, the network management module adapted to generate network events reflective of the network status of all subsystems. A vehicle information module for retrieving information about a vehicle detected in the video data based on the detected vehicle's license plate, and adapted to generate vehicle events based on the information retrieved about the vehicle. A correlation engine for correlating two or more primitive events, the primitive events including primitive video events from the video analytics devices weighted by the attribute data of the surveillance cameras used to capture the video data, audio events from the audio analytics devices weighted by the attribute data of the audio devices used to capture the audio data, tip events from the video tip module weighted by the extracted attribute data, network events from the network management module weighted by attribute data of devices corresponding to the network event, and vehicle events from the vehicle information module weighted by the information retrieved about the vehicle. And an alert/action engine for generating one or more alerts and performing one or more actions based on the correlation performed by the correlation engine.

Another embodiment of the present invention is the system described above that also includes a normalization engine for normalizing the primitive events from the video analytics devices, the audio analytics devices, the video tip module, the network management module, and the vehicle information module. Yet another embodiment of the present invention is the system described above where the correlation engine includes a privacy filter for filtering out primitive events normalized by the normalization engine based on a set of privacy rules, and a business filter for filtering out primitive events normalized by the normalization engine based on a set of business rules. Yet another embodiment of the present invention is the system described above where the correlation engine also includes a compound event detection module for detecting compound events composed of two or more primitive events. Yet another embodiment of the present invention is the system described above where the correlation engine also includes a first event correlation module for correlating the primitive events and the compound events across time, a second event correlation module for correlating the primitive events and the compound events across space, and a rules engine for evaluating one or more rules based on the correlation performed by the first event correlation module and the second event correlation module.

Yet another embodiment of the present invention is the system described above that also includes a learning engine for generating one or more new rules based on the primitive events correlated by the correlation engine and the alerts generated by the alert engine. Another embodiment of the present invention is the system described above where the network management module includes a topological map module for constructing a topological map of the network, where the topological map includes icons for the surveillance cameras, the audio sensory devices, and the data storage devices, and where the icons are connected by lines representing a backbone of the network. Yet another embodiment of the present invention is the system described above where the network management module also includes a physical map module for constructing a physical map of the network, where the physical map includes icons corresponding to physical locations of the surveillance cameras, the audio sensory devices, and the data storage devices, and where the physical map includes at least a street map view and a satellite map view. Yet another embodiment of the present invention is the system described above where the icons corresponding to the physical locations of the surveillance cameras have plumes indicating line-of-sight of the surveillance cameras.

Yet another embodiment of the present invention is the system described above where the icons and their associated plumes indicate a network state as well as a change of network state of the surveillance cameras as determined by the network management module, and where the physical map shows areas of coverage as well as dark areas indicative of the network state of the surveillance cameras. Yet another embodiment of the present invention is the system described above where the icons corresponding to the physical locations of the audio sensory devices have concentric circles indicating an area of coverage of the audio sensory devices. Another embodiment of the present invention is the system described above where the hierarchical storage manager queries a sources table database to extract attribute data about sensory devices used to capture data being cascaded. Yet another embodiment of the present invention is the system described above where the hierarchy of data storage devices includes at least a first-tier device and a second-tier device, the first-tier device having a higher data access performance and a lower storage capacity than the second-tier device, and where the hierarchical storage manager cascades the video data from the first-tier device to the second-tier device based at least on importance of the video data. Yet another embodiment of the present invention is the system described above where the hierarchical storage manager includes a rules module for determining storage locations for segments of video data based on a set of rules based on the importance of the video data, and a rules update module for updating the set of rules for segments of video data based on historical access patterns. Yet another embodiment of the present invention is the system described above where the importance of the video data is calculated based on the primitive events detected in the video data, time period the video data was recorded, and time since the video data was last accessed. Yet another embodiment of the present invention is the system described above where the importance of the video data is calculated as a weighted average of attributes of the video data, where the attributes include resolution of the video data, age of the surveillance camera used to capture the video data, time since the surveillance camera was last maintained, location of the surveillance camera used to capture the video data, and primitive events detected in the video data. Yet another embodiment of the present invention is the system described above where the first-tier device is a disk array and the second-tier device is a tape array.

Another embodiment of the present invention is the system described above where the vehicle information module includes an automatic license plate recognition module for recognizing a license plate on the vehicle, where the vehicle information module generates license plate events corresponding to the recognized license plate, and where the vehicle information module retrieves information from a law enforcement database based on the recognized license plate. Yet another embodiment of the present invention is the system described above where the vehicle information module generates warrant events corresponding to warrant information for a registered owner of the vehicle, and where the correlation engine correlates warrant events from the vehicle information module with other primitive events.

Yet another embodiment of the present invention is the system described above where the vehicle information module generates wanted person events corresponding to wanted person information for a registered owner of the vehicle, and where the correlation engine correlates wanted person events from the vehicle information module with other primitive events. Yet another embodiment of the present invention is the system described above where the vehicle information module generates stolen plate events if the license plate corresponds to a stolen plate, and where the correlation engine correlates stolen plate events from the vehicle information module with other primitive events. Yet another embodiment of the present invention is the system described above where the vehicle information module returns pictures of a registered owner of the vehicle, and where the alerting engine sends the picture of the registered owner of the vehicle to a designated destination if a wanted person event is triggered for the registered owner of the vehicle.

Other embodiments of the present invention include the methods corresponding to the systems describe above.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

The invention claimed is:

1. A safety system to ensure safety procedures are followed, comprising:
one or more sensors for capturing sensory data;
a data storage device for storing the sensory data from the one or more sensors;
one or more processors, operatively coupled to the one or more sensors; and
one or more memories, operatively coupled to the one or more processors, the one or more memories comprising program code which when executed causes the one or more processors to:
capture sensory data from the one or more sensors;
process the sensory data from the one or more sensors, weighted by attribute data representing information about the sensors used to capture the sensory data, to detect primitive events in the sensory data;
correlate two or more primitive events to determine one or more correlated events; and perform one or more actions to ensure safety procedures are followed based on the correlation performed in the correlating step.

2. The safety system of claim 1, wherein the one or more sensors are selected from the group consisting of surveillance camera, surveillance microphone, temperature probe, pressure probe, speedometer, chlorine meter, radon meter, dust particle meter, $CO_2$ meter, water meter, electrical meter, blood pressure meter, and heart rate meter.

3. The safety system of claim 1, further comprising program code to:

detect compound events composed of two or more primitive events.

4. The safety system of claim 3, further comprising program code to:

time correlate the primitive events and the compound events across time;

space correlate the primitive events and the compound events across space; and evaluate one or more rules based on the correlation performed in the time correlating step and the space correlating step.

5. The safety system of claim 1, further comprising program code to:

generate one or more new rules based on the primitive events correlated in the correlating step and the actions performed in the action step.

6. The safety system of claim 1, further comprising program code to:

receive tip data from one or more external sources;

determine attribute data for the tip data, the attribute data representing the reliability of the source of the tip data; and generate tip events based on the tip data and the attribute data.

7. The safety system of claim 1, further comprising program code to:

manage storage and cascade of the sensory data in a hierarchy of data storage devices based on the attribute data corresponding to a source of the sensory data.

8. The safety system of claim 7, wherein the hierarchy of data storage devices includes at least a first-tier device and a second-tier device, the first-tier device having a higher data access performance and a lower storage capacity than the second-tier device.

9. The safety system of claim 8, further comprising program code to:

determine storage locations for segments of sensory data based on a set of rules based on an importance of the sensory data.

10. The safety system of claim 1, further comprising program code to:

monitor network status of the one or more sensors; and generate network events reflective of the network status of the one or more sensors.

11. The safety system of claim 1, further comprising program code to:

retrieve information about a vehicle detected in the sensory data based on the detected vehicle's license plate; and generate vehicle events based on the information retrieved about the vehicle.

12. A safety system to ensure safety procedures are followed, comprising:

one or more sensors for capturing sensory data;

a data storage device for storing the sensory data from the one or more sensors;

one or more data processing units, adapted to process the sensory data from one or more of the sensors, weighted by attribute data representing information about the sensors used to capture the sensory data, and to detect primitive events in the sensory data;

a correlation engine for correlating two or more primitive events from the data processing units to determine one or more correlated events; and an action engine for performing one or more actions to ensure safety procedures are followed based on the correlation performed by the correlation engine.

13. A safety method, comprising the steps of:

capturing sensory data from one or more sensors;

storing the sensory data from the one or more sensors in a data storage device;

processing the sensory data from the sensors, weighted by attribute data representing information about the sensors used to capture the sensory data, to detect primitive events in the sensory data using a computer processor;

correlating two or more primitive events to determine one or more correlated events using the computer processor; and performing one or more actions to ensure safety procedures are followed based on the correlation performed in the correlating step.

14. The safety method of claim 13, further comprising:

detecting compound events composed of two or more primitive events.

15. The safety method of claim 14, further comprising:

time correlating the primitive events and the compound events across time;

space correlating the primitive events and the compound events across space; and evaluating one or more rules based on the correlation performed in the time correlating step and the space correlating step.

16. The safety method of claim 13, further comprising:

receiving tip data from one or more external sources;

determining attribute data for the tip data, the attribute data representing the reliability of the source of the tip data; and generating tip events based on the tip data and the attribute data.

17. The safety method of claim 13, further comprising:

managing storage and cascade of the sensory data in a hierarchy of data storage devices based on the attribute data corresponding to a source of the sensory data.

18. The safety method of claim 17, further comprising:

determining storage locations for segments of sensory data based on a set of rules based on an importance of the sensory data.

19. The safety method of claim 13, further comprising:

monitoring network status of the one or more sensors; and generating network events reflective of the network status of the one or more sensors.

20. The safety method of claim 13, further comprising:

retrieving information about a vehicle detected in the sensory data based on the detected vehicle's license plate; and generating vehicle events based on the information retrieved about the vehicle.

* * * * *